United States Patent [19]
Saito et al.

[11] Patent Number: 5,508,761
[45] Date of Patent: Apr. 16, 1996

[54] APPARATUS FOR REPRODUCING A DIGITAL PATTERN FROM MOTION PICTURE FILM, AND THE MOTION PICTURE FILM

[75] Inventors: Etsuro Saito; Katsuichi Tachi; Kiyoshi Inatome; Hideki Ando; Tetsuro Makise; Yoshiyuki Suzuki, all of Kanagawa, Japan

[73] Assignees: Sony Corporation, Tokyo, Japan; Sony Cinema Products Corporation, Culver City, Calif.

[21] Appl. No.: 350,408

[22] Filed: Dec. 6, 1994

[30] Foreign Application Priority Data

Dec. 7, 1993 [JP] Japan ................................ 5-340176
Jun. 25, 1994 [JP] Japan ................................ 6-166225

[51] Int. Cl.⁶ ................................................ G03B 31/02
[52] U.S. Cl. ................................ 352/26; 360/3; 369/14
[58] Field of Search ................................ 352/1, 5, 8, 11, 352/26, 27, 37; 360/3, 32, 48, 53; 369/14

[56] References Cited

U.S. PATENT DOCUMENTS 4,306,781 12/1981 Mosley ................................ 352/37
4,461,552 7/1984 Levine ................................ 352/27
4,491,399 2/1985 Bell ................................ 352/92
4,600,280 7/1986 Clark ................................ 352/37
4,893,921 1/1990 Beauviala ................................ 352/92
5,327,182 7/1994 Kohut ................................ 352/27
5,450,248 9/1995 Van Eijck et al. ................................ 360/32
5,453,802 9/1995 Kohut ................................ 352/27

*Primary Examiner*—Howard B. Blankenship
*Assistant Examiner*—Matthew Miller
*Attorney, Agent, or Firm*—William S. Frommer; Alvin Sinderbrand

[57] ABSTRACT

A motion picture film is provided on which a digital sound track for audio data is formed along the film running direction. Data tracks are disposed in the digital sound track along a direction normal to the film running direction and extend in the film running direction. A data pattern having a block of audio data is recorded in the data tracks, along with tracking patterns representing each data track. Each of the tracking patterns is recorded at one side of the data track along the film running direction with an offset in the film running direction of one half the width of a data track from the center of that data track.

10 Claims, 34 Drawing Sheets

FIG. 7

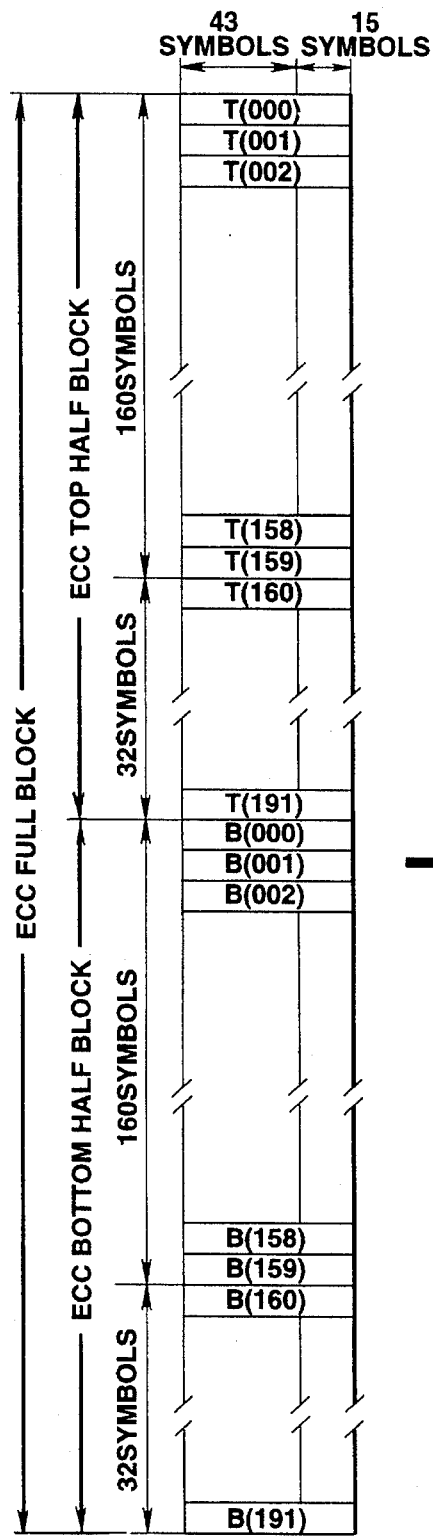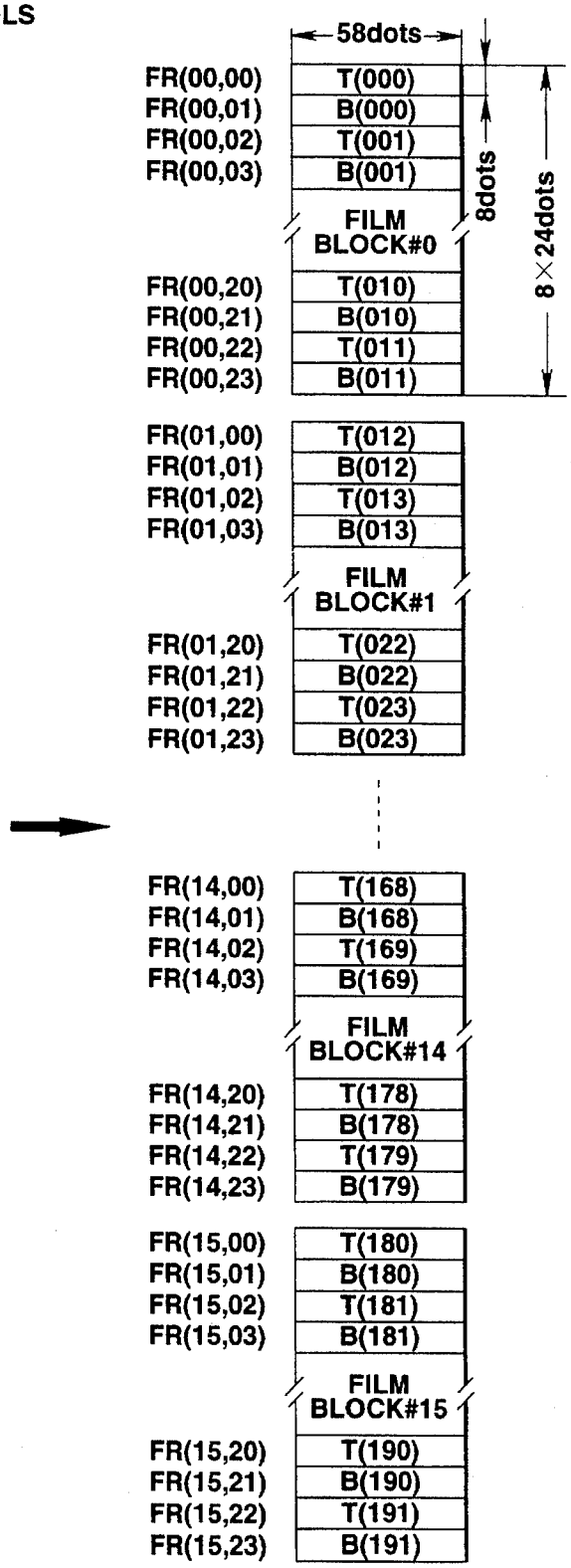
FIG.15A     FIG.15B

| Left column | Right column |
|---|---|
| ⋮ | ⋮ |
| Cn | Cn-α |
| Ln | Rn-α |
| CLn | CRn-α |
| SLn | SRn-α |
| SWn | SWn-α |
| RMn | LMn-α |
| ⋮ | ⋮ |
| RMn+α-1 | LMn-1 |
| Cn+α | Cn |
| Ln+α | Rn |
| CLn+α | CRn |
| SLn+α | SRn |
| SWn+α | SWn |
| RMn+α | LMn |
| Cn+α+1 | Cn+1 |
| ⋮ | ⋮ |
| Cn+2α | Cn+α |
| Ln+2α | Rn+α |
| CLn+2α | CRn+α |
| SLn+2α | SRn+α |
| SWn+2α | SWn+α |
| RMn+2α | LMn+α |
| ⋮ | ⋮ |

UNCORRECTABLE (bracket spans from Cn+α to RMn+α in left column)

FIG.22

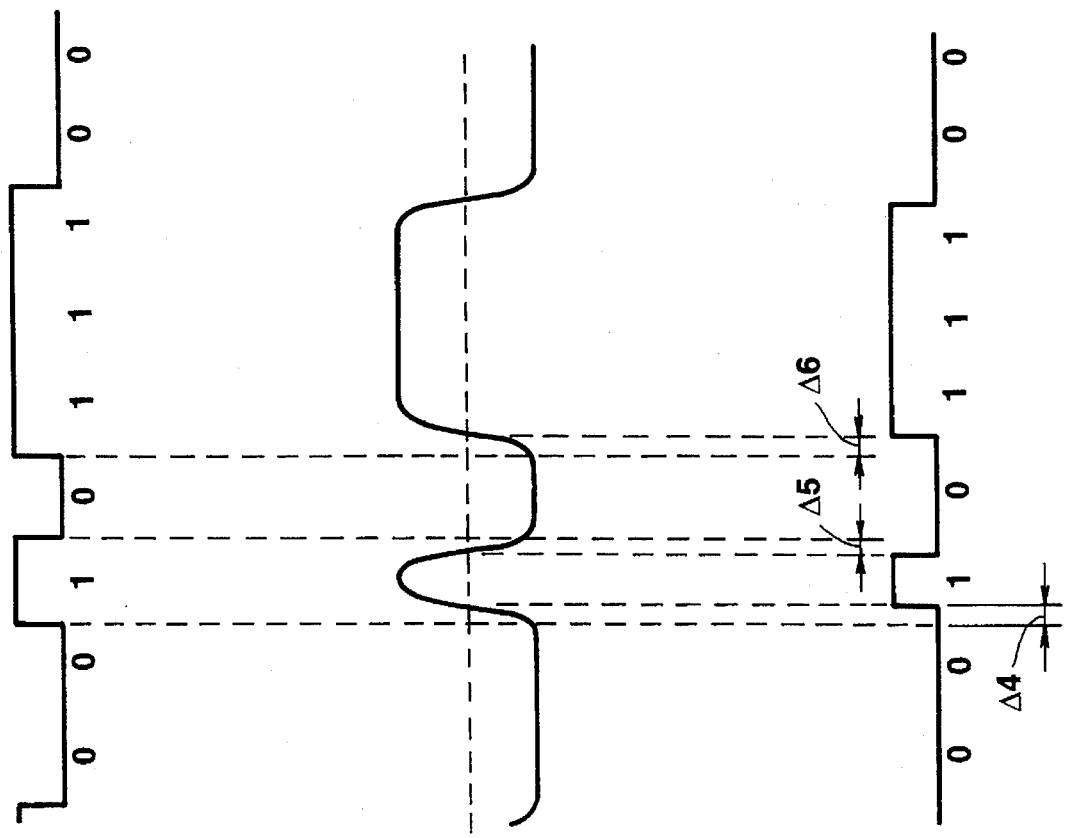

APPARATUS FOR REPRODUCING A DIGITAL PATTERN FROM MOTION PICTURE FILM, AND THE MOTION PICTURE FILM

FIELD OF THE INVENTION

This invention relates to a technique of reproducing a digital pattern from a sound track of a motion picture film.

BACKGROUND OF THE INVENTION

In a conventional motion picture film, picture recording regions are arranged in frames at a mid portion of the film. On each side of the picture recording region is a series of evenly-spaced perforations called film take-up holes. This series of take-up holes extends along the longitudinal direction of the motion picture film, that is, along the direction of film travel (the film running direction). A linear analog sound track extends along the film running direction between one side of the picture recording region and that side's corresponding series of take-up holes. Analog audio signals are recorded on this sound track.

Recent progress in digital technology has enabled the digital recording of the contents of this analog soundtrack. Nevertheless, since the recording positions of the picture recording regions and the analog sound track are standardized by the Society Motion Picture and Television Engineers (SMPTE), digitized audio information must be recorded in positions other than the designated recording positions of the picture recording regions and the analog sound track.

Specifically, audio data comprises data for the right channel and data for the left channel. This audio data is recorded in a linear manner in each digital sound track provided along the film running direction between the series of take-up holes and both lateral film edges.

The recorded audio data is arranged in a series of blocks. A synchronization pattern is recorded at the leading end of the series of blocks. A tracking pattern is recorded at the recording start portion and the recording end portion of each block. If each block is thought of as having a horizontal length and vertical height, the horizontal length extends along the film running direction, and the vertical height extends in a direction normal to the film running direction.

The reproducing apparatus reproduces the digital audio data from the motion picture film by using two CCD line sensors provided for optically scanning the digital sound tracks on the motion picture film. Each CCD line sensor has a one-line reading region provided in a direction normal to the film running direction. During reproduction, the light radiated from the back surface of the motion picture film is radiated on each of the reading regions via digital sound tracks formed on the motion picture film. This causes the synchronization data, audio data, and the tracking patterns recorded on the digital sound tracks to be illuminated and radiated on the readout regions of the CCD line sensors.

After CCD line sensors receive the illuminated synchronization data, audio data, and the tracking patterns, they convert these received signals into electrical signals which are routed to a data processor. The data processor reproduces the audio data on a block-by-block basis in synchronization with the synchronization data. The data processor then routes the reproduced audio data to a D/A converter, which converts the audio data into analog audio signals and routes the analog audio signals to a speaker unit. The speaker generates sound in accordance with the received analog audio signals.

The data processor detects the tracking pattern from the CCD line sensor for tracking control. As stated above, the tracking pattern is recorded at the recording start position and the recording end position. Thus, the data processor detects the level difference, for example, between the tracking pattern reproduced at the recording start position and the tracking pattern reproduced at the recording end position, in order to detect any tracking errors. The readout timing of the CCD line sensor is variably controlled in response to the tracking error.

Correcting the tracking error permits the CCD line sensors to read audio data from the center of each data track, instead of from a position that is offset from the center of such tracks.

However, when the tracking pattern is provided at the recording start position and the recording end position for recording audio data, the available space for audio data regions is reduced, and therefore, the amount of audio data is also decreased. Although tracking patterns are necessary for accurately reproducing audio data, the decrease in recorded audio data that results from using tracking patterns in this manner also decreases the reproduced sound quality.

OBJECTS AND SUMMARY OF THE INVENTION

It is therefore an object of the present invention to provide an apparatus for reproducing a digital audio pattern from a motion picture film.

It is another object of the present invention to provide a motion picture film in which the accurate reproduction of audio data is possible even when tracking is offset.

It is still another object of the present invention to provide a motion picture film on which a maximum amount of audio data can be recorded.

In one aspect of the present invention, a motion picture film is provided on which a digital sound track for recording audio data is formed along a film running direction. The film comprises digital audio tracks, in which are recorded a plurality of blocks of audio data. These blocks extend along the film running direction and a direction normal to the film running direction. The tracks also include tracking patterns recorded at one side of the digital audio track along the film running direction and offset by one-half track width from a center of the data track along the film running direction.

In accordance with the motion picture film of the present invention, since the tracking pattern is recorded at only one side of a digital sound track, the recording area for audio data can be made wider and therefore, the amount of data for recording audio information can be increased. Further, an azimuth check pattern is recorded for a block of audio data and is used with the tracking patterns to compensate tracking errors. Therefore, the recording area for audio data is expanded without decreasing the ability of tracking error correction.

In accordance with the reproducing apparatus of the invention, the reproducing level of the audio data can be compensated in accordance with the variation of the actual recording level. Therefore, the error rate can be reduced and more accurate reproduction can be expected from the recorded audio data in the digital sound track because the data pattern level being read out of the digital sound track is adjusted in accordance with the reproduced level of the detected tracking pattern.

In addition, the reproducing apparatus further includes means for determining a threshold value based on the reproduced level of the tracking pattern and means for generating a binary signal that represents the reproduced data pattern. This binary signal is generated in accordance with the determined threshold value. Since the appropriate threshold level can be determined by the actual recording level, the error rate can be reduced. Therefore, more accurate reproduction can be expected from the recorded audio data in the digital sound track.

These and other objects, advantages and features of the invention will become apparent to those skilled in the art upon consideration of the following description of the invention.

BRIEF DESCRIPTION OF THE DRAWINGS

FIG. 7 shows one embodiment of audio data of the left route recorded in a compression processing block of the motion picture film shown in FIG. 1.

FIGS. 15(a) and 15(b) illustrate interleaving executed at an interval of plural compression blocks.

FIG. 22 illustrates the manner in which audio data for the motion picture film shown in FIG. 1 is recorded with a pre-set shift between the right channel route and the left channel route.

FIGS. 33(a) to 33(c) show waveforms during playback operation with another undesired error.

DETAILED DESCRIPTION OF PREFERRED EMBODIMENTS

Figure 1:
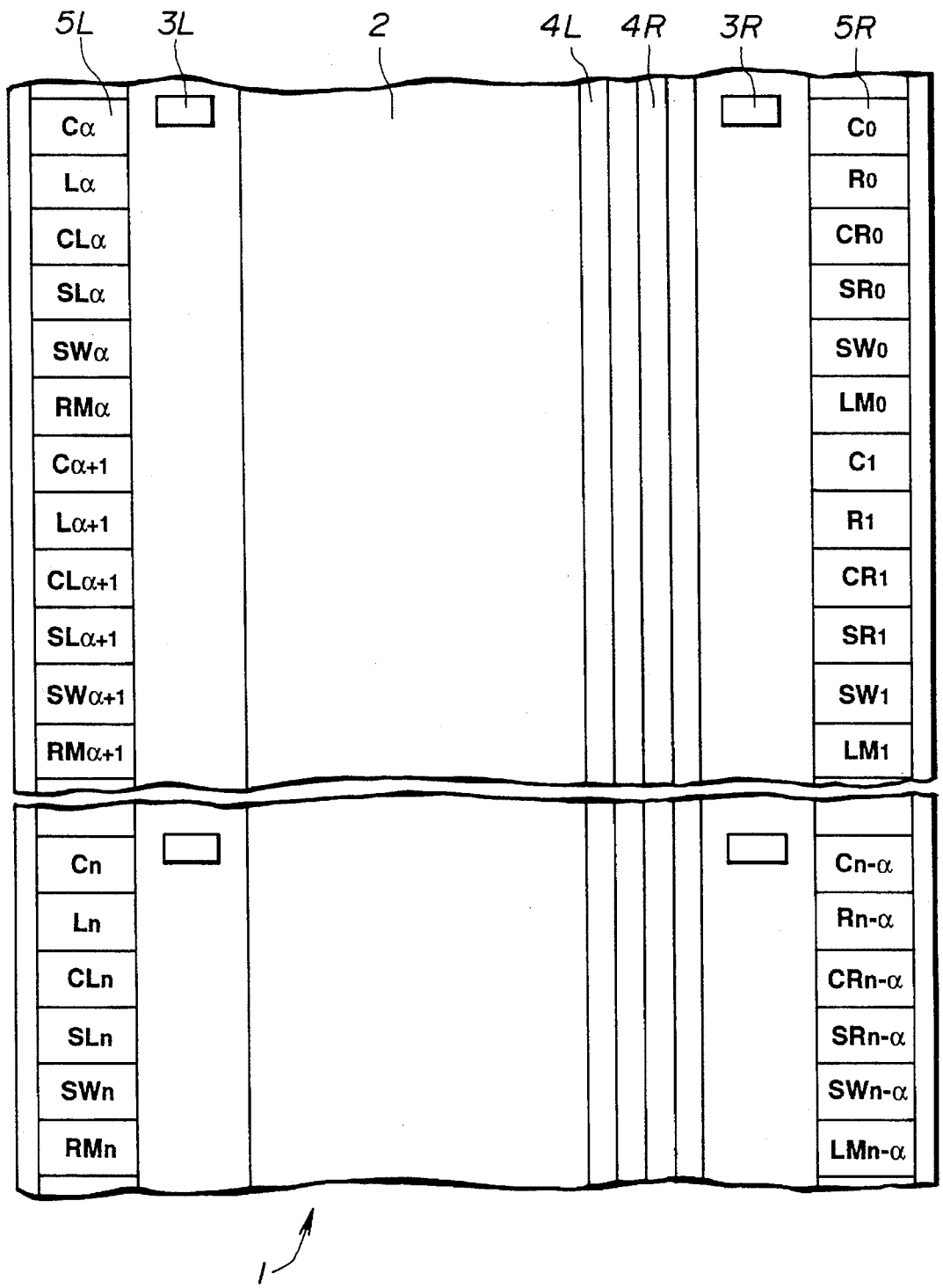
FIG. 1 shows the recording mode for the motion picture film embodying the present invention.

Referring to FIG. 1, the motion picture film 1 of the present embodiment has a picture recording area 2 for recording a picture to be projected, a perforation area 3L and a perforation area 3R comprising a plurality of film take-up holes for transporting the motion picture film for projection, an analog sound track 4L and an analog sound track 4R for enabling audio signals to be reproduced by conventional equipment, and a digital sound track 5L and a digital sound track 5R for recording multi-channel digital audio data.

Left and right channel analog audio signals are recorded on the analog sound tracks 4L and 4R, respectively.

Left and right channel digitized audio signals are recorded on the digital sound tracks 5L and 5R, respectively.

In the digital sound track 5L, there are recorded a center channel (C), a left channel (L), a center left channel (CL), a surround left channel (SL) and a sub-woofer channel (SW), in this order. Digital sound track 5L also includes a right mix channel (RM), which is formed from a right channel (R), a center right channel (CR) and a surround right channel (SR). The right mix channel is recorded immediately after the sub-woofer channel (SW). That is, C, L, CL, SL, SW and RM, as stated above, are recorded as a left-route region of audio data in digital sound track 5L.

In the digital sound track 5R, there are recorded a center channel (C), a right channel (R), a center right channel (CR), a surround right channel (SR) and a sub-woofer channel (SW), in this order. Digital sound track 5R also includes a left mix channel (LM), which is formed from a left channel (L), a center left channel (CL) and a surround left channel (SL). The left mix channel is recorded immediately after the sub-woofer channel (SW). That is, C, R, CR, SR, SW and LM, as stated above, are recorded as a right-route region of audio data in the digital sound track 5R.

Figure 2:
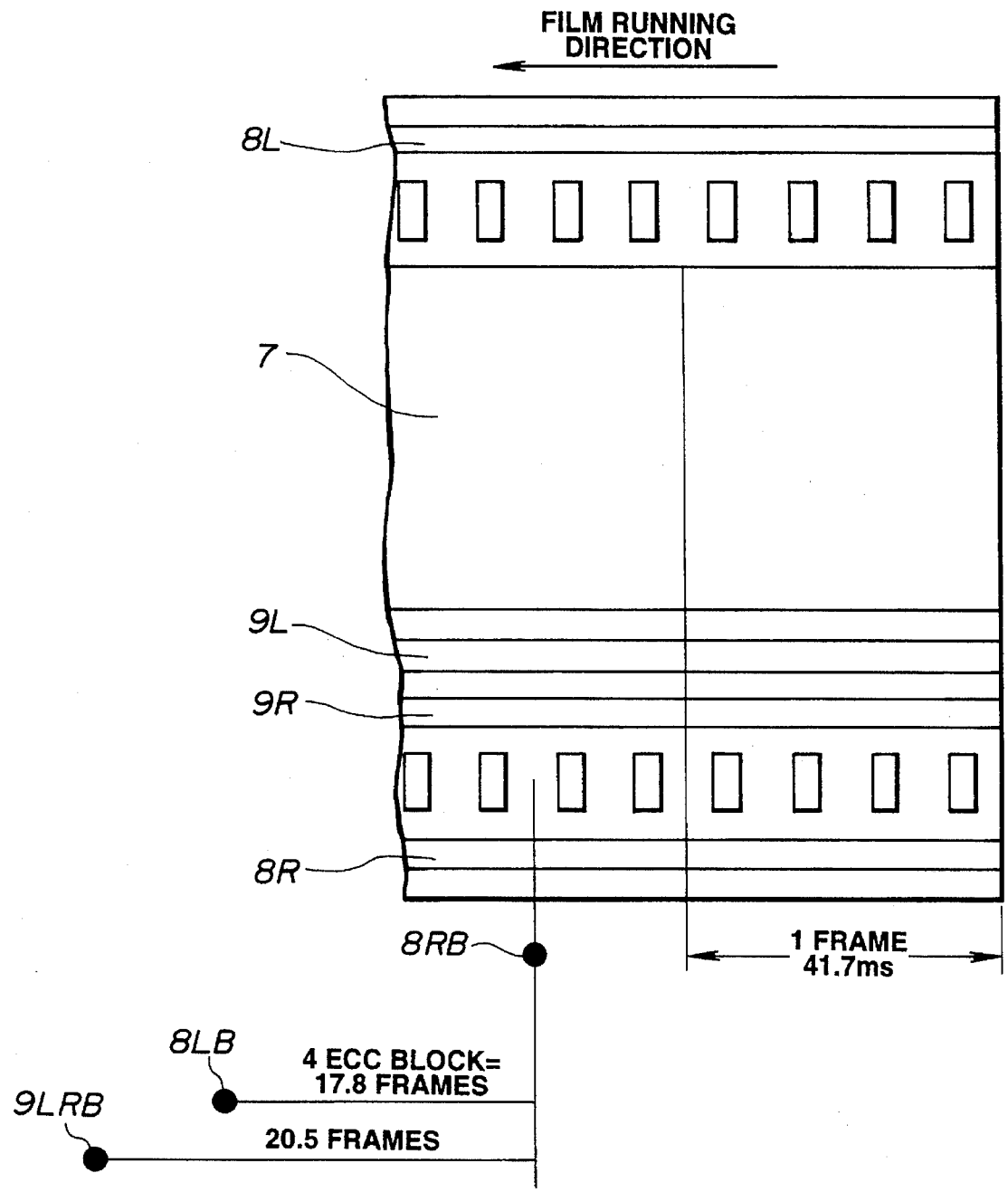
FIG. 2 illustrates the manner in which the audio data of the motion picture film shown in FIG. 1 are recorded with a pre-set shift between the left route and the right route.

It is noted that suffixes "n" or "n-α" indicate a time sequence of order. For example, Cn of the digital sound track 5L indicates that the audio data is the in the nth position in the time sequence of the center channel (C), while Cn-α of the digital sound track 5R indicates that the audio data is in the (n-α)th position in the time sequence of the center channel (C). That is, audio data that lags with respect to data recorded on the digital sound track 5L is recorded on the digital sound track 5R. Referring to FIG. 2, the audio data having the same timing as the audio data recorded at a reference point 8RB on a digital sound track 8R at the center of a frame 7 of the motion picture film is recorded at the position 8LB ahead by 4 ECC blocks (=17.8 frames).

That is, the audio data at the position 8LB on the digital sound track 8L is reproduced earlier than the audio data at the position 8RB on the digital sound track 8R.

The position on the analog sound track in which the same timing audio data is recorded is 9LRB, which is 20.5 frames ahead of the reference point 8RB.

Figure 3:
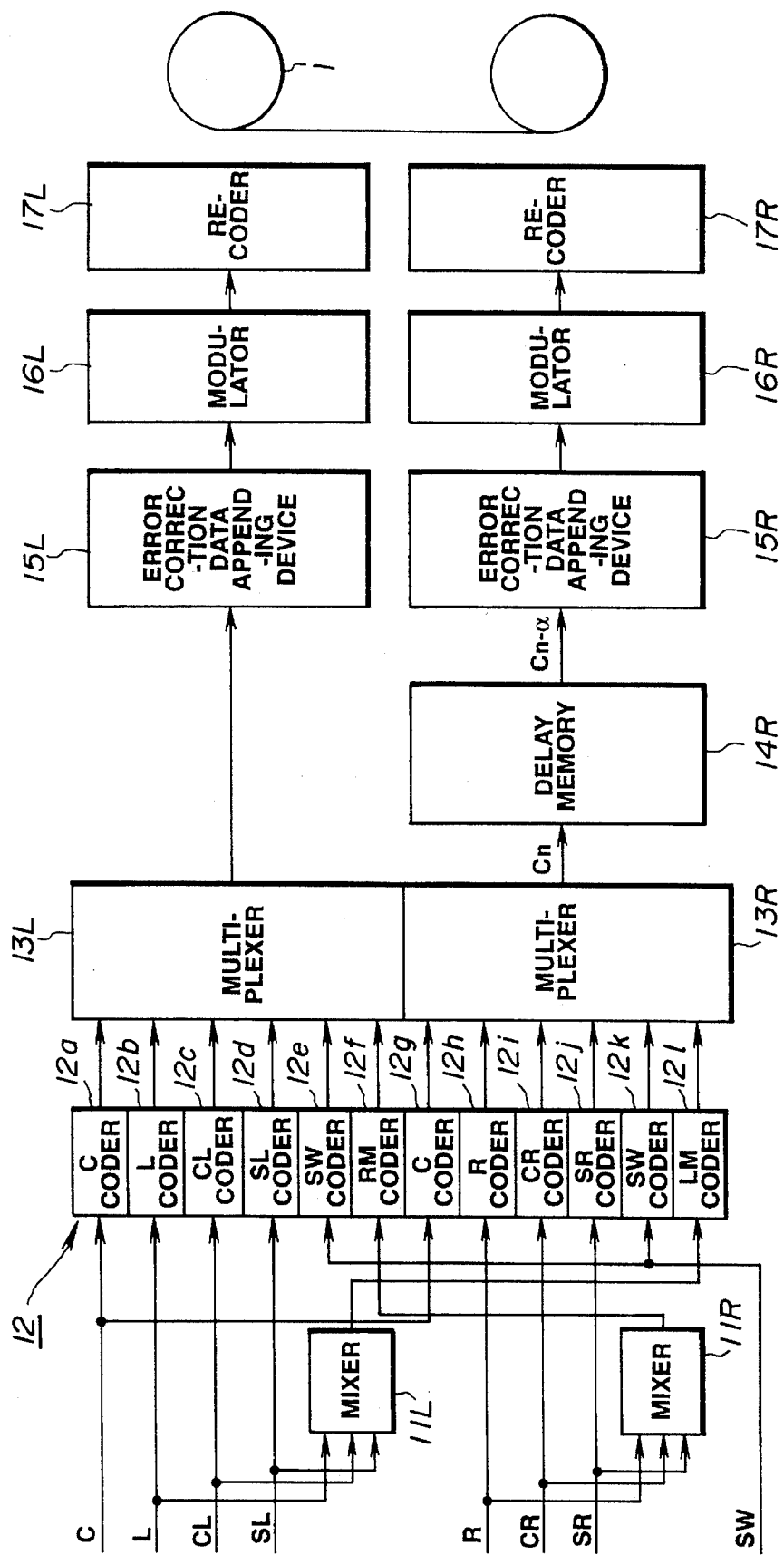
FIG. 3 is a block diagram showing the recording system of the reproducing apparatus for a motion picture film shown in FIG. 1.

The recording apparatus for the motion picture film according to the embodiment of the invention is configured as shown in FIG. 3.

Mixer 11L generates the left mix channel (LM) from L, CL and SL. Mixer 11R generates the right mix channel (RM) from R, CR and SR. Coders 12a to 12f code the left-channel audio data. Coders 12g to 12l code the right-channel audio data. Left channel multiplexer 13L serially transmits to error correction data appending device 15L the left channel audio data that is coded by the coders 12a to 12f. Right channel multiplexer 13R serially transmits to delay memory 14R the right channel audio data that is coded by the coders 12g to 12l.

Error correction data appending device 15L appends error correction code (ECC) to the left channel audio data. Delay memory 14R adds a pre-set delay to the right channel audio data from the multiplexer 13R. Error correction data appending device 15R appends error correction codes (ECC) to the right channel audio data. Modulators 16L and 16R modulate in a pre-set manner the audio data of the respective channels and the corresponding error correction codes. Recorders 17L and 17R record the modulated audio data of the respective channels onto the digital sound tracks 5L and 5R, respectively.

The operation of the motion picture film recorder is hereinafter explained.

Referring to FIG. 3, audio data of the center channel (C) is routed to coders 12a and 12g, while audio data of the sub-woofer channel (SW) is routed to coders 12e and 12k. The audio data L, CL and SL are routed to coders 12b to 12d, while the audio data R, CR and SR are routed to coders 12h to 12j. The audio data L, CL and SL are also routed to mixer 11L, while the audio data R, CR and SR are routed to the mixer 11R.

Mixer 11L forms the left mix channel audio data (LM) from the audio data L, CL and SL and transmits this data to coder 12l. Mixer 11R forms the right mix channel audio data (RM) from the audio data R, CR and SR, and transmits this data to coder 12f.

Coders 12a to 12f use high-efficiency coding (ATRAC) combined from sub-band coding, orthogonal transform coding and bit allocation to compress the data volume of the left channel audio data by one-fifth. Coders 12a to 12f then route the compressed data in parallel to multiplexer 13L.

Coders 12g to 12l use high-efficiency coding (ATRAC) combined from sub-band coding, orthogonal transform coding, and bit allocation to compress the data volume of the right channel audio data by one-fifth. Coders 12g to 12l then route the compressed data in parallel to the multiplexer 13R.

Multiplexer 13L serially converts the left channel audio data supplied in parallel from the coders 12a to 12f. The converted serial data comprises the sequence of C, L, CL, SL, SW, and RM. Multiplexer 13L then routes the serial data to error correction data appending device 15L.

Multiplexer 13R serially converts the right channel audio data supplied in parallel from the coders 12g to 12l. The converted serial data comprises the sequence of C, R, CR, SR, SW, and LM. Multiplexer 13R then routes the serial data to delay memory 14R.

Delay memory 14R delays the right channel audio data by 17.8 frames, which shifts the recording positions of the left channel and right channel audio data by 17.8 frames. Delay memory 14R then routes the delayed data to error correction data appending circuit 15R.

Error correction data appending circuits 15L and 15R append to the audio data C2 parity and C1 parity error correcting signals, which employ the cross-interleave Reed Solomon code. Circuits 15L and 15R then route the resulting audio data to modulators 16L and 16R.

Modulators 16L and 16R append synchronization data and tracking patterns to the audio data and route the resulting data to recorders 17L and 17R.

Recorders 17L and 17R record the digital audio data onto the digital sound tracks 5L and 5R of the motion picture film 1 for each film block. Recorders 17L and 17R record the digital audio data in the form of compression processing blocks.

Figure 4:
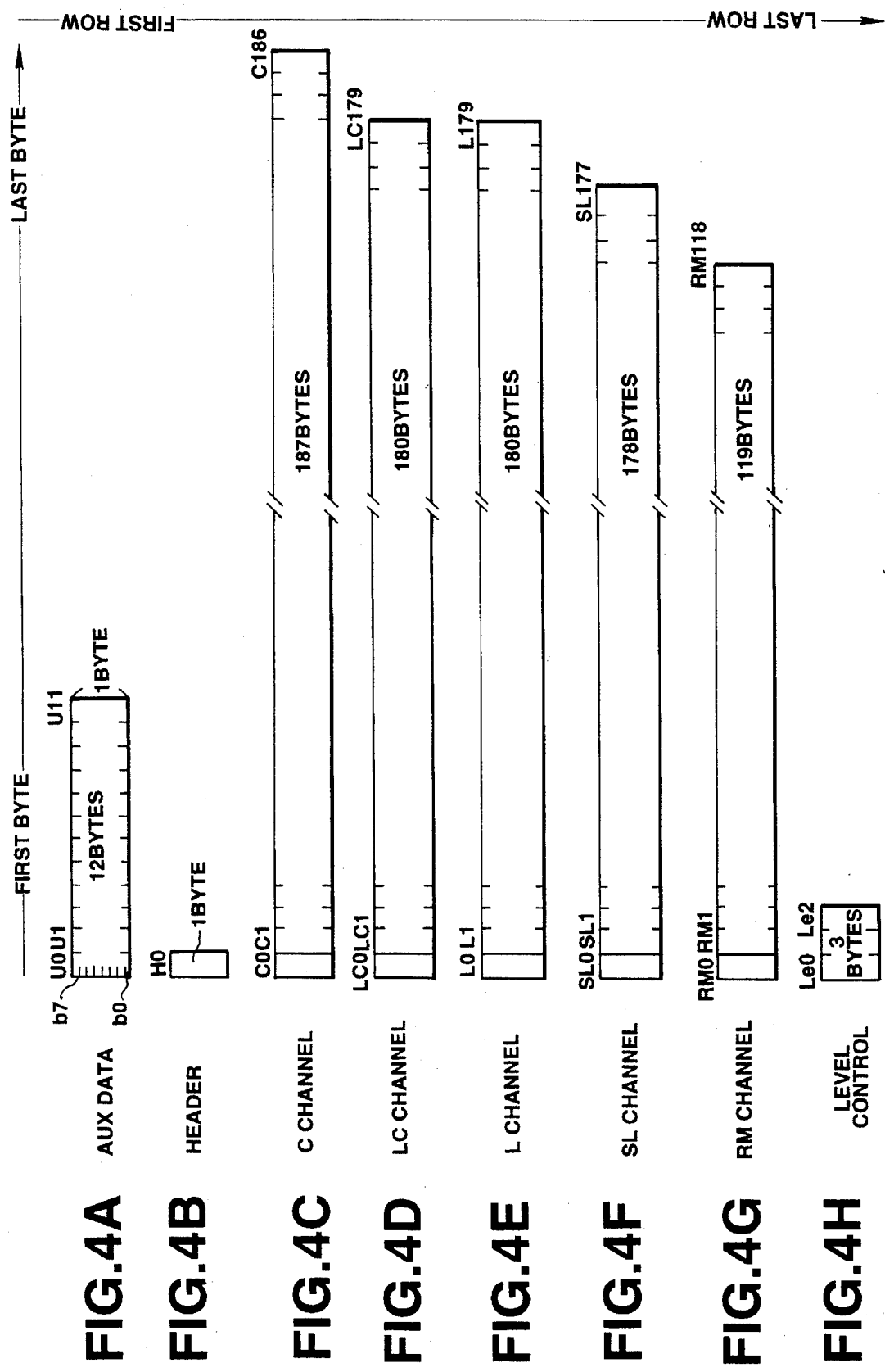
FIGS. 4(a) to 4(h) show one embodiment of audio data of the left route recorded in a compression processing block of the motion picture film shown in FIG. 1.

FIGS. 4a to 4h and FIG. 5 collectively show one embodiment of a left channel audio data compression block that is recorded onto the motion picture film 1. Each left channel compression processing block comprises a plurality of bytes, with each byte being formed of 8 bits, b0 to b7. Each left channel compression processing block includes auxiliary data (AUX DATA) of 12 bytes (FIG. 4a), a 1-byte header H0 (FIG. 4b), a center channel (C) comprising 187 bytes, C0 to C186 (FIG. 4c), a left center channel (LC) comprising 180 bytes, LC0 to LC179 (FIG. 4d), a left channel (L) comprising 180 bytes, L0 to L179 (FIG. 4e), a surround left channel (SL) comprising 178 bytes, SL0 to SL177 (FIG. 4f), a right mix channel (RM) comprising 119 bytes, RM0 to RM118 (FIG. 4g), and a level control comprising 3 bytes, LE0 to LE2 (FIG. 4h).

Byte LE0 of the level control data indicates the audio data level of the right channel; byte LE1 indicates the audio data level of the right center channel; and byte LE2 indicates the audio data level of the surround right channel.

Figure 5:
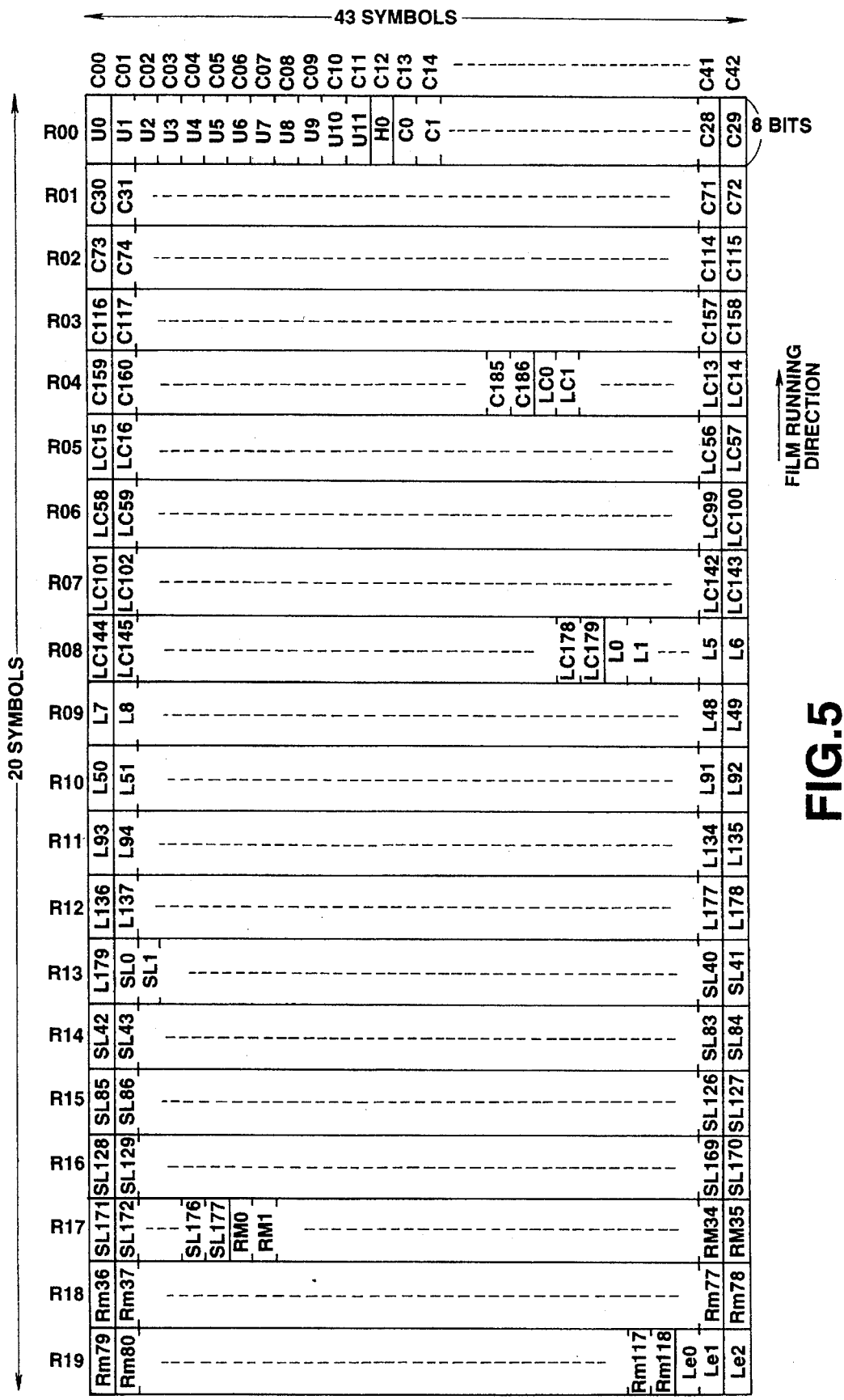
FIG. 5 shows one embodiment of audio data of the left route recorded in a compression processing block of the motion picture film shown in FIG. 1.

FIG. 5 illustrates a left channel audio data compression block that has been recorded onto the motion picture film. All of the bytes of the compression block are organized into 20 data strings, R00 to R19. Each data string comprises 43 bytes (symbols). The data strings are recorded along the film running direction, and the bytes that comprise each data string are adjacent to one another in a direction that is at right angles to the film running direction. The top of each data string illustrated in FIG. 5 is considered to be the beginning of each data string when referring to a particular byte position within any data string. That is, the top byte position of any data string is the first byte position, the byte position immediately below the top is the second byte position, etc.

Referring to FIG. 5, the 12-byte auxiliary data U0 to U11 are recorded in the first data string R00. Also included in data string R00 are the 1-byte header H0 and the first 30 bytes of the 187 byte center channel audio data. The remaining bytes of the center channel audio data are recorded in data strings R01 to R03 and in the first 28 byte positions of data string R04.

The first 15 bytes of the 180 byte left center channel are recorded in the remainder of data string R04. The remaining 165 bytes of the left center channel occupy the sixth to eighth data strings, R05 to R07, and the first 36 byte positions of data string R08.

The first 7 bytes of the 180 byte left channel are recorded in the remaining 7 byte positions of data string R08. The remaining 173 bytes of the left channel audio data occupy data strings R09 to R12 and the first byte position of data string R13.

The first 42 bytes of the 178 byte surround left channel are recorded in the remaining 42 byte positions of data string R13. Data strings R14 to R16 and the first seven byte positions of data string R17 record the remaining 136 bytes of the surround left channel.

The remaining 36 byte positions of data string R17 record the first 36 bytes of the 119 byte right mix channel. The remaining 83 bytes of the right mix channel are recorded in data string R18 and in the first 40 byte positions of data string R19. The level control data bytes are recorded in the remaining 3 byte positions of data string R19.

Figure 6:
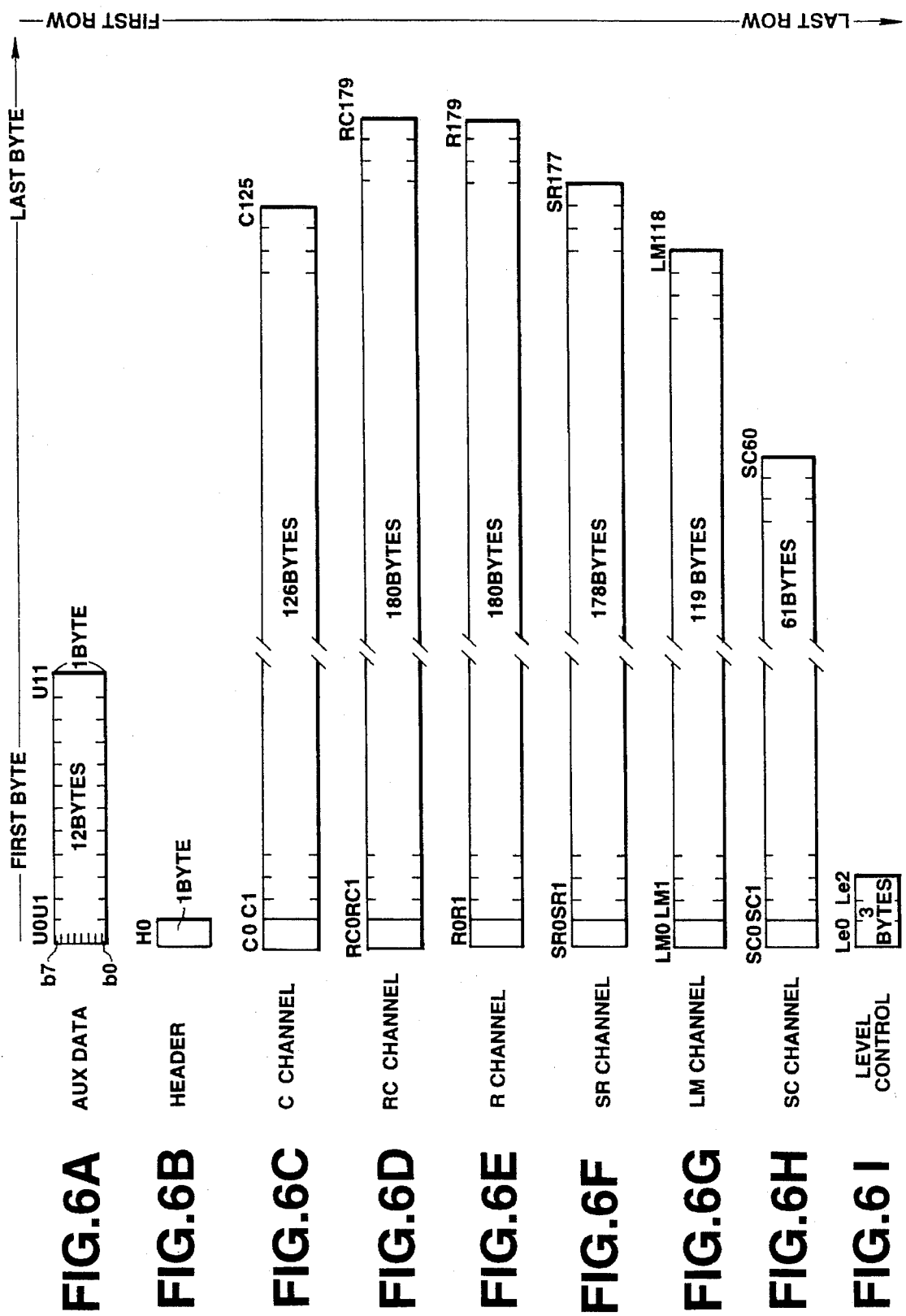
FIGS. 6(a) to 6(i) show one embodiment of audio data of the right route recorded in a compression processing block of the motion picture film shown in FIG. 1.

FIGS. 6a to 6i and FIG. 7 collectively show one embodiment of a right channel audio data compression block. Each right channel compression processing block comprises a plurality of bytes, and each byte is formed of 8 bits, b0 to b7. Each right channel compression processing block includes auxiliary data (AUX DATA) of 12 bytes (FIG. 6a), a 1-byte header H0 (FIG. 6b), a center channel (C) comprising 126 bytes, C0 to C125 (FIG. 6c), a right center channel (RC) comprising 180 bytes, RC0 to RC179 (FIG. 6d), a right channel (R) comprising 180 bytes, R0 to R179 (FIG. 6e), a surround right channel (SR) comprising 178 bytes, SR0 to SR177 (FIG. 6f), a left mix channel (LM) comprising 119 bytes, LM0 to LM118 (FIG. 6g), a surround channel (SC) comprising 61 bytes, SC0 to SC60 (FIG. 6h), and a level control comprising 3 bytes, LE0 to LE2, (FIG. 6i).

Byte LE0 of the level control data indicates the audio data level of the left channel; byte LE1 indicates the audio data level of the left center channel; and byte LE2 indicates the audio data level of the surround left channel.

Figure 7:
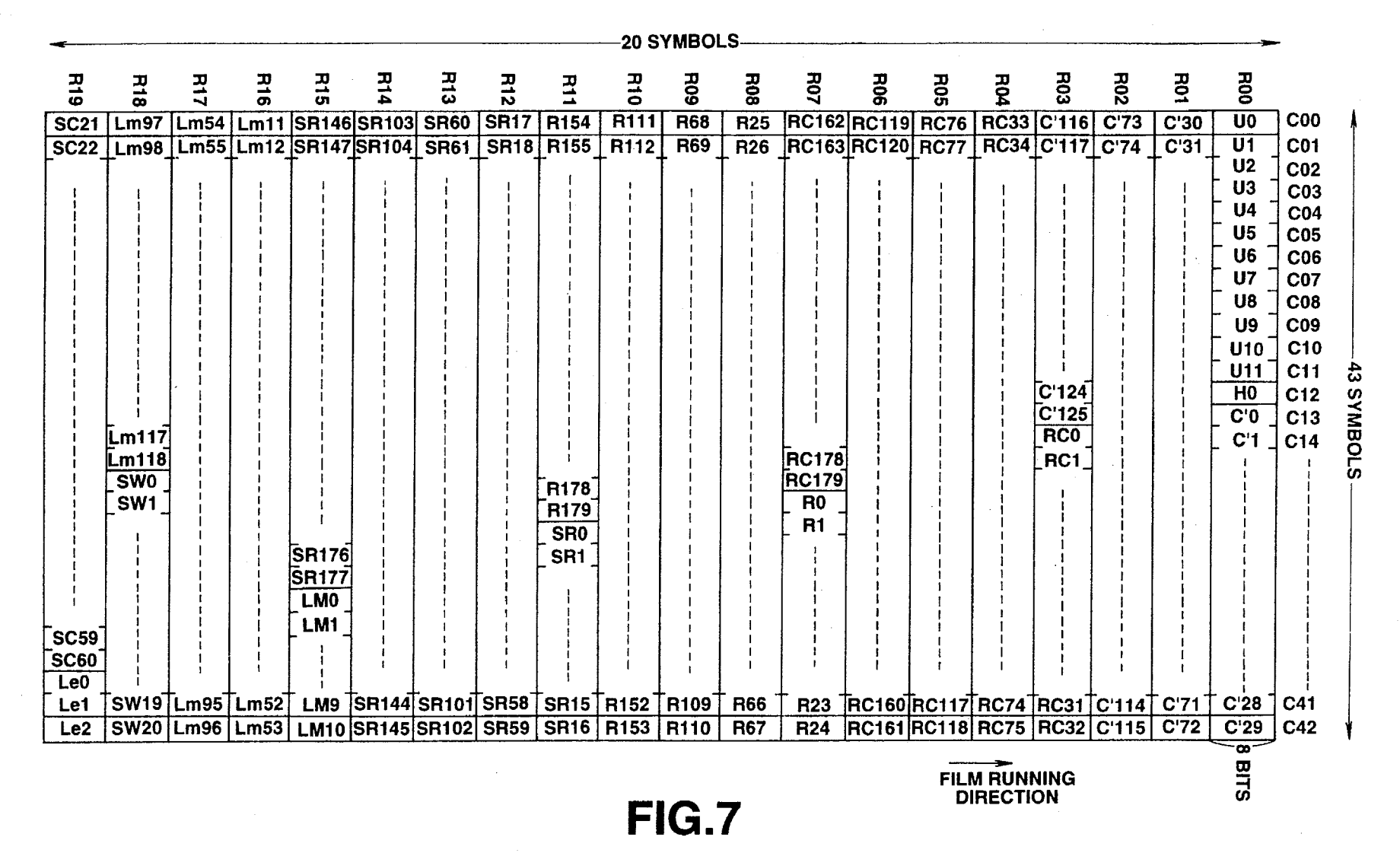

FIG. 7 illustrates a left channel audio data compression block that has been recorded onto the motion picture film. All of the bytes of the compression block are organized into 20 data strings, R00 to R19. Each data string comprises 43 bytes (symbols). The data strings are recorded along the film running direction, and the bytes that comprise each data string are adjacent to one another in a direction that is at right angles to the film running direction. The top of each data string illustrated in FIG. 7 is considered to be the beginning of each data string when referring to a particular byte position within any data string. That is, the top byte position of any data string is the first byte position, the byte position immediately below the top is the second byte position, etc.

Referring to FIG. 7, the 12-byte auxiliary data U0 to U11 are recorded in the first data string R00. Also included in data string R00 are header H0 and the first 30 bytes of the 126 byte center channel audio data. The remaining bytes of the center channel audio data are recorded in data strings R01, R02, and in the first 10 byte positions of data string R03.

The first 33 bytes of the 180 byte right center channel are recorded in the remaining 33 byte positions of data string R03. The remaining 147 bytes of the right center channel are recorded in data strings R04 to R06 and in the first 18 byte positions of data string R07.

The first 25 bytes of the 180 byte right channel audio data are recorded in the remaining 25 byte positions of data string R07. The remaining 155 bytes of the right channel audio data are recorded in data strings R08 to R10 and in the first 26 byte positions of data string R11.

The first 17 bytes of the 178 byte surround right channel audio data are recorded in the remaining 17 byte positions of data string R11. The remaining 161 bytes of the surround right channel are recorded in data strings R12 to R14 and in the first 32 byte positions of data string R15.

The first 11 bytes of the 119 byte left mix channel audio data are recorded in the remaining 11 bytes of data string R15. The remaining 108 bytes of the left mix channel audio data are recorded in data strings R16, R17, and in the first 22 byte positions of data string R18.

The first 21 bytes of the 61 byte surround channel audio data are recorded in the remaining 21 byte positions of data string R18. The remaining 40 bytes of the surround channel audio data are recorded in the first 40 byte positions of data string R19. The level control is recorded in the remaining 3 bytes of data string R19.

FIGS. 8a to 8i and FIG. 9 collectively show another embodiment of a left channel audio data compression block. Each left channel compression processing block comprises a plurality of bytes, and each byte is formed of 8 bits, b0 to b7. Each left channel compression processing block includes a 1-byte ATRAC header H0' (FIG. 8a), a 3-byte level control data comprising Le0' to Le2' (FIG. 8b), a center channel (C') comprising 182 bytes C0' to C181' (FIG. 8c), a left center channel (LC') comprising 182 bytes, LC0' to LC181' (FIG. 8d), a left channel (L') comprising 182 bytes, L0' to L181' (FIG. 8e), a surround left channel (SL') comprising 182 bytes, SL0' to SL181' (FIG. 8f), a right mix channel (RM') comprising 114 bytes, RM0' to RM113' (FIG. 8g), a subwoofer channel (SW') comprising 6 bytes, SW'0 to SW'5

Figure 8:
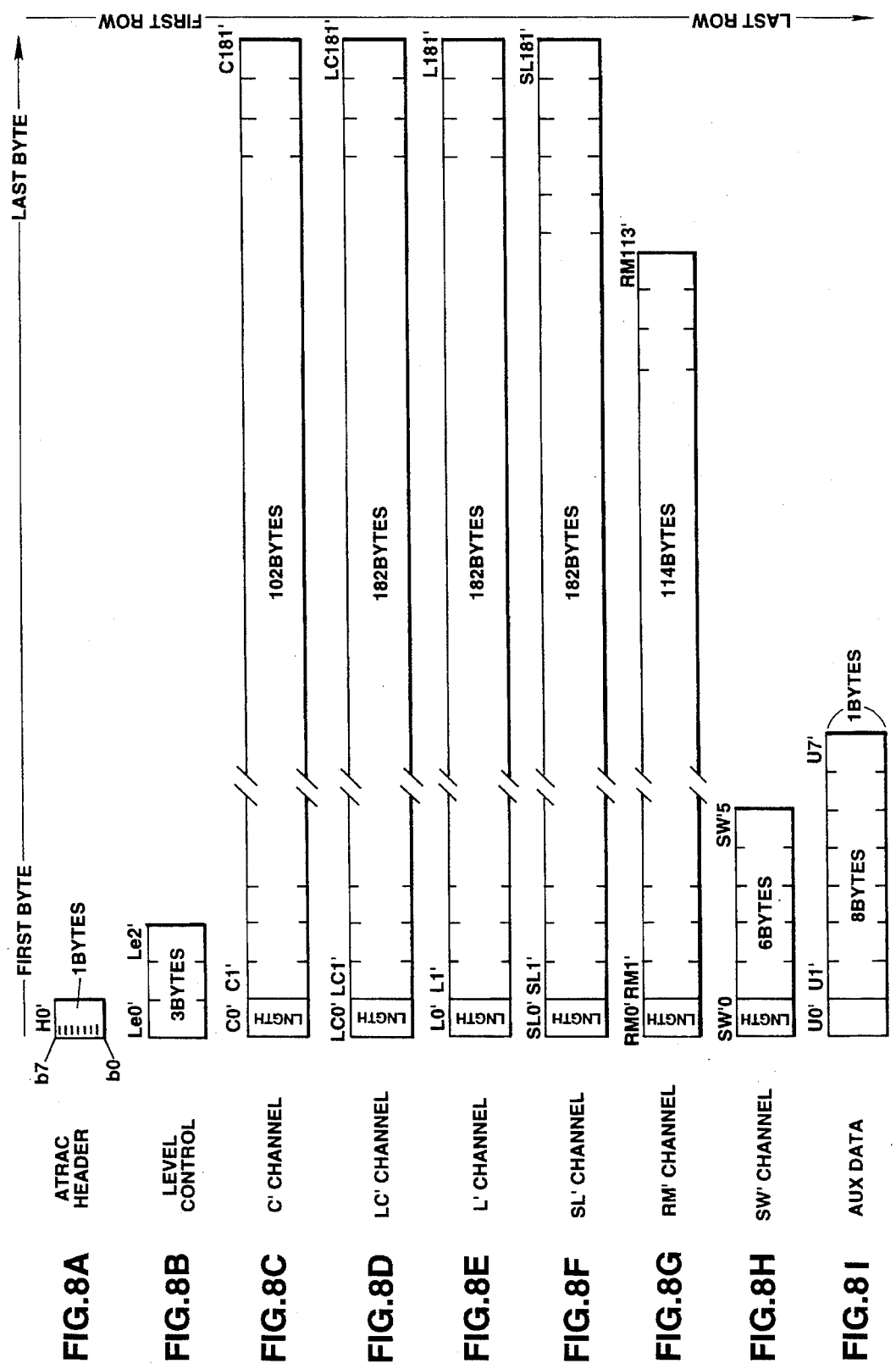
FIGS. 8(a) to 8(i) show another embodiment of audio data of the left route recorded in a compression processing block of the motion picture film shown in FIG. 1.

(FIG. 8h), and auxiliary data (AUX DATA) of 8 bytes, U0 to U7 (FIG. 8i).

Byte LE0 of the level control data indicates the audio data level of the right channel; byte LE1 indicates the audio data level of the right center channel; and byte LE2 indicates the audio data level of the surround right channel.

Figure 9:
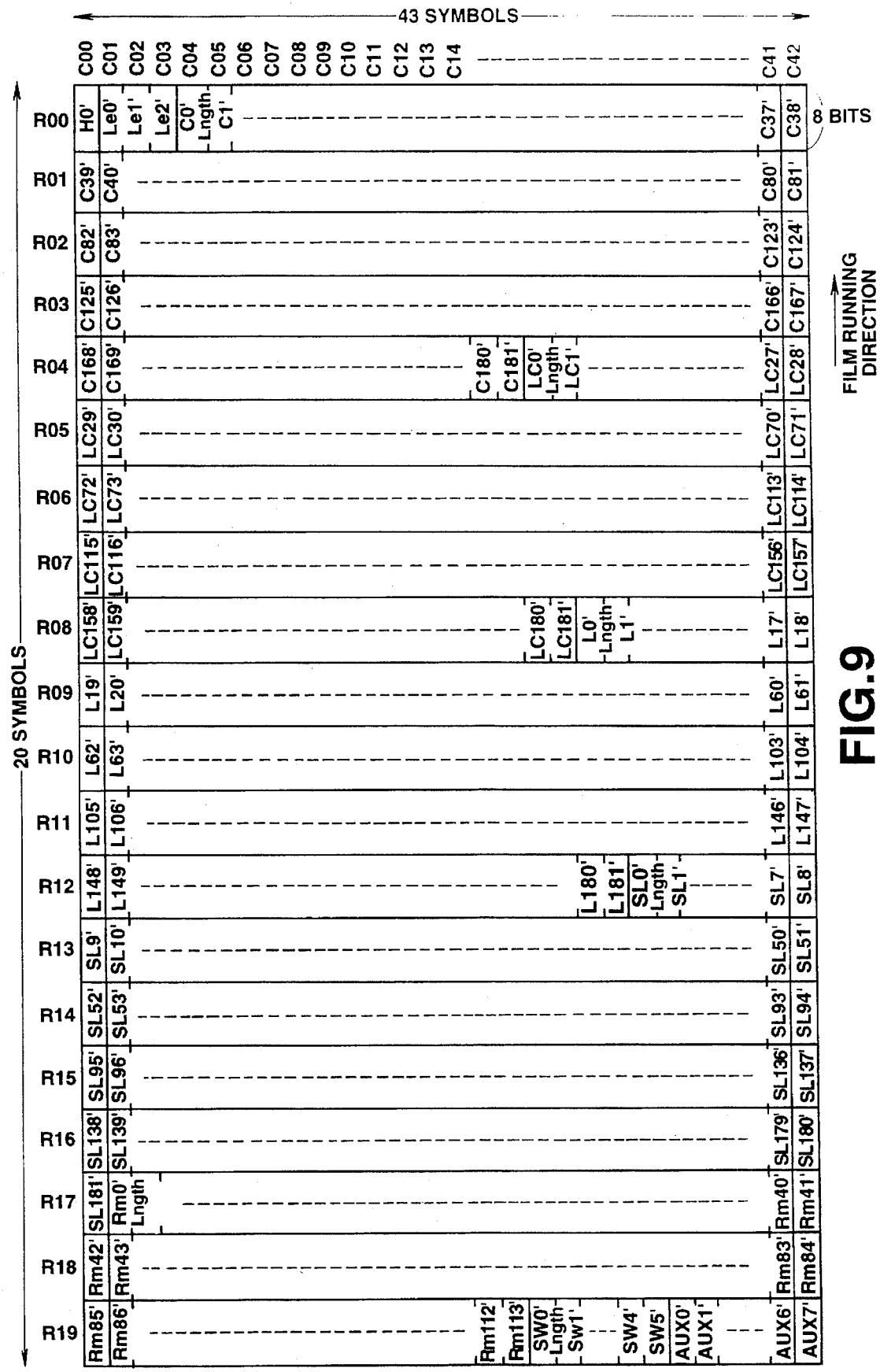
FIG. 9 shows another embodiment of audio data of the left route recorded in a compression processing block of the motion picture film shown in FIG. 1.

FIG. 9 illustrates a left channel compression processing block that has been recorded onto the motion picture film 1. All of the bytes of the compression block are organized into 20 data strings, R00 to R19. Each data string comprises 43 bytes (symbols). The data strings are recorded along the film running direction, and the bytes that comprise each data string are adjacent to one another in a direction that is at right angles to the film running direction. The top of each data string illustrated in FIG. 9 is considered to be the beginning of each data string when referring to a particular byte position within any data string. That is, the top byte position of any data string is the first byte position, the byte position immediately below the top is the second byte position, etc.

Referring to FIG. 9, the 1 byte ATRAC header H0' is recorded in the first data string R00. Also included in data string R00 are the 3 byte level control and the first 39 bytes of the 182 byte center channel audio data. The remaining 143 bytes of the center channel audio data are recorded in data strings R01 to R03 and in the first 14 byte positions of data string R04.

The first 29 bytes of the 182 byte left center channel audio data are recorded in the remaining 29 byte positions of data string R04. The remaining 153 bytes of the left center channel are recorded in data strings R05 to R07 and in the first 24 bytes of data string R08.

The first 19 bytes of the 182 byte left channel audio data are recorded in the remaining 19 byte positions of data string R08. The remaining 163 bytes of the left channel audio data are recorded in data strings R09 to R11 and in the first 34 byte positions of data string R12.

The first 9 bytes of the surround left channel audio data are recorded in the remaining 9 byte positions of data string R12. The remaining 173 bytes of the surround left channel audio data are recorded in data strings R13 to R16 and in the first byte position of data string R17.

The first 42 bytes of the 114 byte right mix channel audio data are recorded in the remaining 42 bytes of data string R17. The remaining 72 bytes of the right mix channel audio data are recorded in data string R18 and in the first 29 byte positions of data string R19. Sub-woofer channel audio data and the auxiliary data occupy the remaining byte positions of data string R19.

Figure 10:
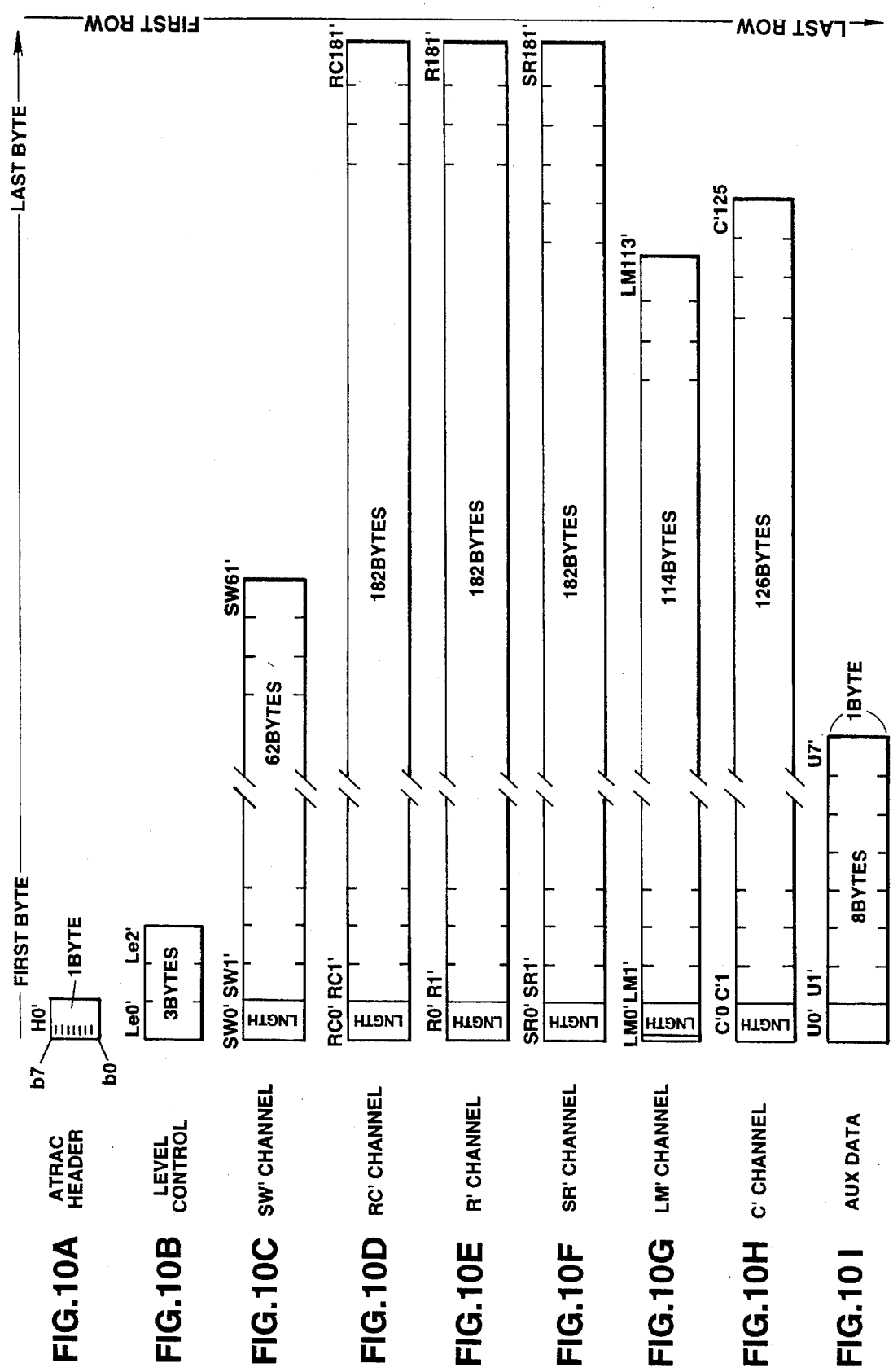
FIGS. 10(a) to 10(i) show another embodiment of audio data of the right route recorded in a compression processing block of the motion picture film shown in FIG. 1.

FIGS. 10a to 10i and FIG. 11 collectively show another embodiment of a right channel compression processing block. Each right channel processing block comprises a plurality of bytes, and each byte is formed of 8 bits, b0 to b7. Each right channel compression black includes a 1-byte ATRAC header H0' (FIG. 10a), a level control data comprising 3 bytes, Le0' to Le2' (FIG. 10b), a sub-woofer channel (SW') comprising 62 bytes, SW0' to SW61' (FIG. 10c), a right center channel (RC') comprising 182 bytes, RC0' to RC181' (FIG. 10d), a right channel (R') comprising 182 bytes, R0' to R181' (FIG. 10e), a surround right channel (SR') comprising 182 bytes, SR0' to SR181' (FIG. 10f), a left mix channel (LM') comprising 114 bytes, LM0' to LM113' (FIG. 10g), a center channel (C') comprising 126 bytes, C0' to C125' (FIG. 10h) and auxiliary data (AUX DATA) comprising 8 bytes, U0' to U7' (FIG. 10i).

Byte Le0' of the level control data indicates the audio data level of the right channel; byte Le1' indicates the audio data level of the right center channel; and byte Le2' indicates the audio data level of the surround right channel.

Figure 11:
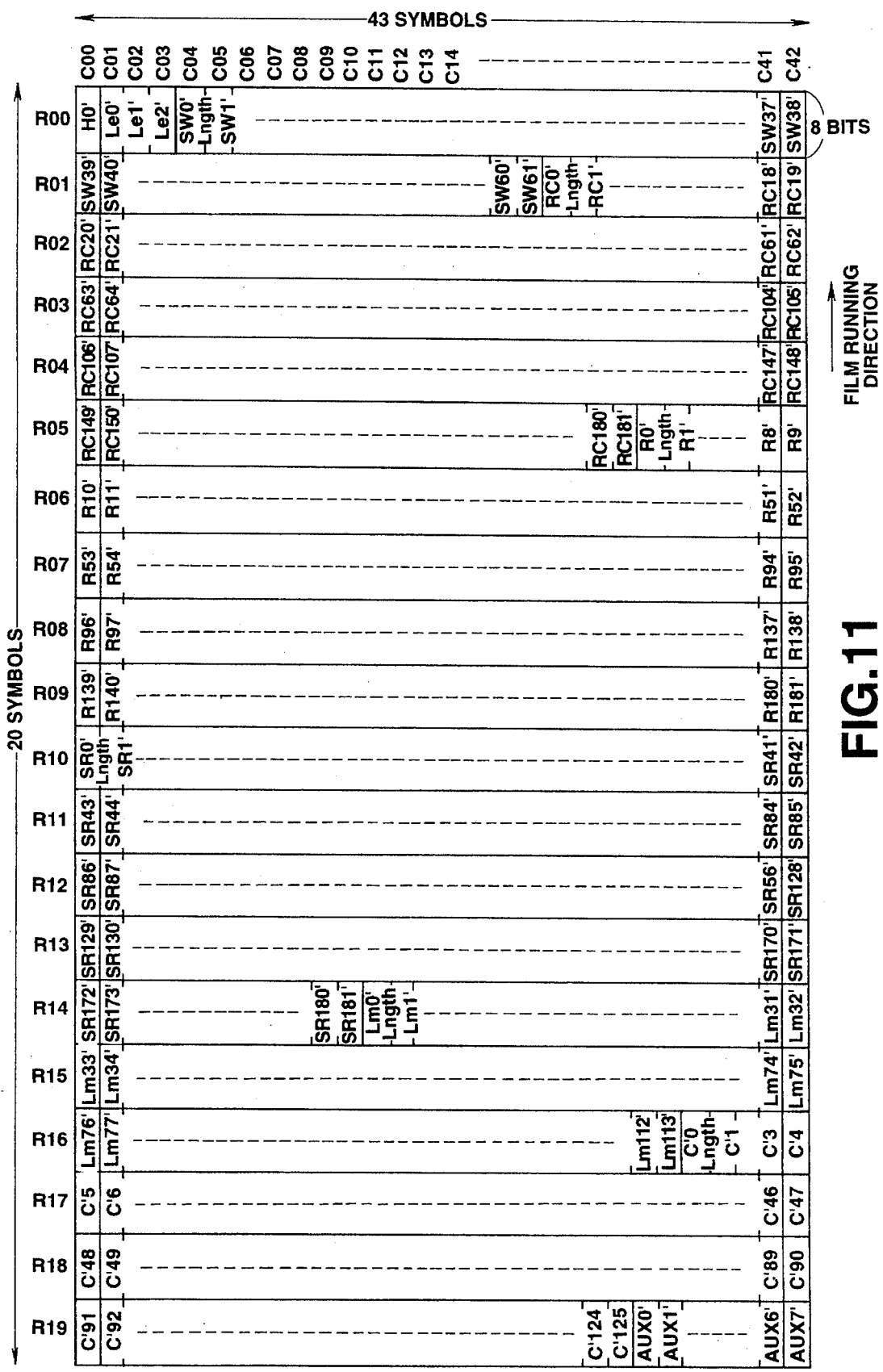
FIG. 11 shows another embodiment of audio data of the left route recorded in a compression processing block of the motion picture film shown in FIG. 1

FIG. 11 illustrates a right channel compression processing block that has been recorded onto the motion picture film 1. All of the bytes of the compression block are organized into 20 data strings, R00 to R19. Each data string comprises 43 bytes (symbols). The data strings are recorded along the film running direction, and the bytes that comprise each data string are adjacent to one another in a direction that is at right angles to the film running direction.

Referring to FIG. 11, the 1 byte ATRAC header H0' is recorded in the first data string R00. Also included in data string R00 are the 3 byte level control data and the first 39 bytes of the 62 byte sub-woofer channel audio data. The remaining 23 bytes of the sub-woofer channel audio data are recorded in the first 23 bytes of data string R01.

The first 20 bytes of the 182 byte right center channel are recorded in the remaining 20 bytes of data string R01. The remaining 162 bytes of the right center channel are recorded in data strings R02 to R04 and in the first 33 bytes of data string R05.

The first 10 bytes of the 182 byte right channel audio data are recorded in the remaining 10 bytes of the data string R05. The remaining 172 bytes of the right channel audio data are recorded in data strings R06 to R09.

The first 172 bytes of the 182 byte surround right channel audio data are recorded in data strings R10 to R13. The remaining 10 bytes of the surround right channel audio data are recorded in the first 10 bytes of data string R14.

The first 33 bytes of the 114 byte left mix channel audio data are recorded in the remaining 33 bytes of data string R14. The remaining 81 bytes of the left mix channel are recorded in data string R15 and in the first 38 bytes of data string R16.

The first 5 bytes of the 126 byte center channel audio data are recorded in the remaining 5 bytes of data string R16. The remaining 121 bytes of the center channel audio data are recorded in data strings R17, R18, and in the first 35 bytes of data string R19. The 8 byte auxiliary data are stored in the remaining 8 bytes of data string R19.

Thus, FIGS. 9 and 11 each illustrate a compression processing block that comprises data strings R00 to R19, each data string further comprising 43 bytes.

A comparison of the first embodiment of a compression processing block (shown in FIGS. 4a to 4h, 5, and in FIGS. 6a to 6i and 7) with the second embodiment of a compression block (shown in FIGS. 8a to 8i, 9, and in FIGS. 10a to 10i and 11) reveals that the sub-woofer channel (SW) in the second embodiment is repeatedly recorded in digital sound tracks. Even the 62 byte SW channel data of the right channel compression processing block of FIG. 10(c) is compressed to 6 bytes in the left channel compression processing block of FIG. 8(h), it is possible to recover the sub-woofer audio signal even though the 62 byte SW channel data is lost due to scratches on the film or a long burst signal.

Figure 12:
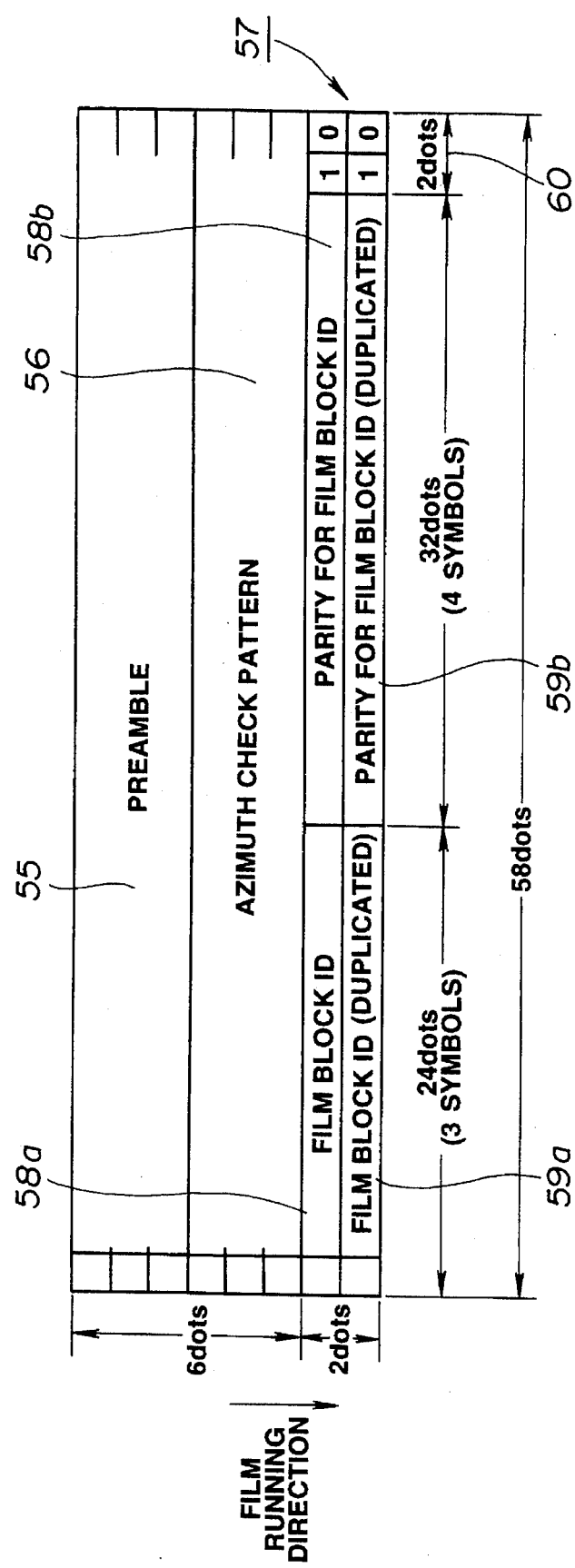
FIG. 12 shows the leading end data recorded at the leading end of the compression processing block.

Each compression processing block as described above, further includes the leading end data shown in FIG. 12.

Referring to FIG. 12, the leading end data comprises preamble 55, which in turn comprises 58 dots (or bit) that are arranged at a right angle with respect to the film running direction and 3 dots extending along the film running direction. Azimuth check pattern 56 has 58 dots arranged at a right angle with respect to the film running direction and 3 dots extending along the film running direction. Block identification number (block ID) comprises 58 dots in a direction at right angle to the film running direction and 2 dots extending along the film running direction.

Block ID 57 includes a film block identification number 58a, a parity 58b for the film block identification number 58a, and a 2 dot reserve 60 following parity 58b. The film block identification number 58a comprises 24 dots arranged at a right angle with respect to the film running direction and 1 dot extending along the film running direction. The parity 58b is located next to the film block identification 58a, and it comprises 32 dots arranged at a right angle with respect to the film running direction and 1 dot extending along the film running direction. The following 2-dot reserve 60 is at right angles to the film running direction. Block ID 57 also includes duplicates of the data of the film block ID, parity, and 2-dot reserve (59a, 59b, 60). These duplicates are arranged with respect to the motion picture film the same way as the original data elements of block ID 57.

Figure 13:
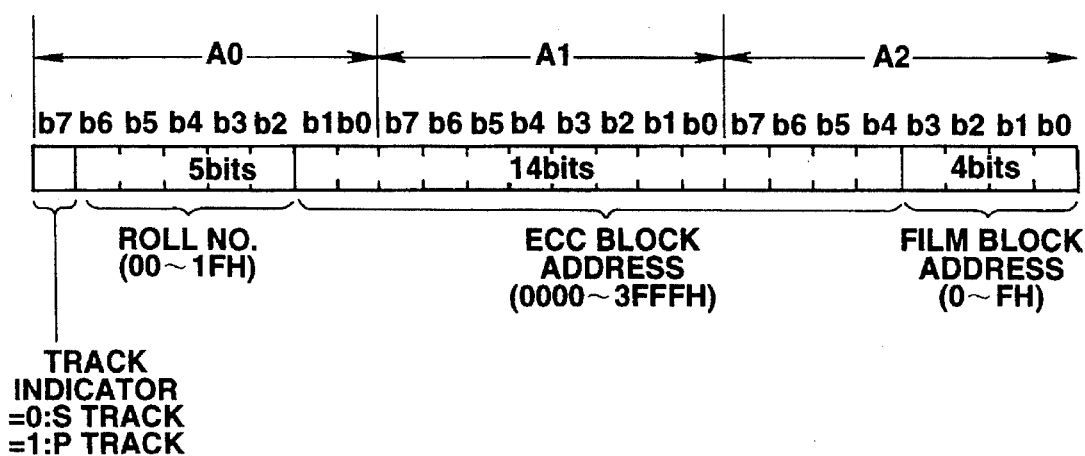
FIG. 13 shows data recorded at a block ID of the leading end data.

FIG. 13 illustrates the contents of the film block identification number 58a. It includes a 1-bit track indicator, a 5-bit roll number, a 14-bit error correction code (ECC) block address, and a 4-bit film block address. The track indicator is "0" when the film block identification number corresponds to the right channel audio data. The track indicator is "1" when the film block identification number corresponds to the left channel audio data. The roll number records the motion picture film number, and the ECC block address records the addresses of the C1 parity and the C2 parity for the compression processing block. The address of the film block is recorded in the film block address.

Figure 14:
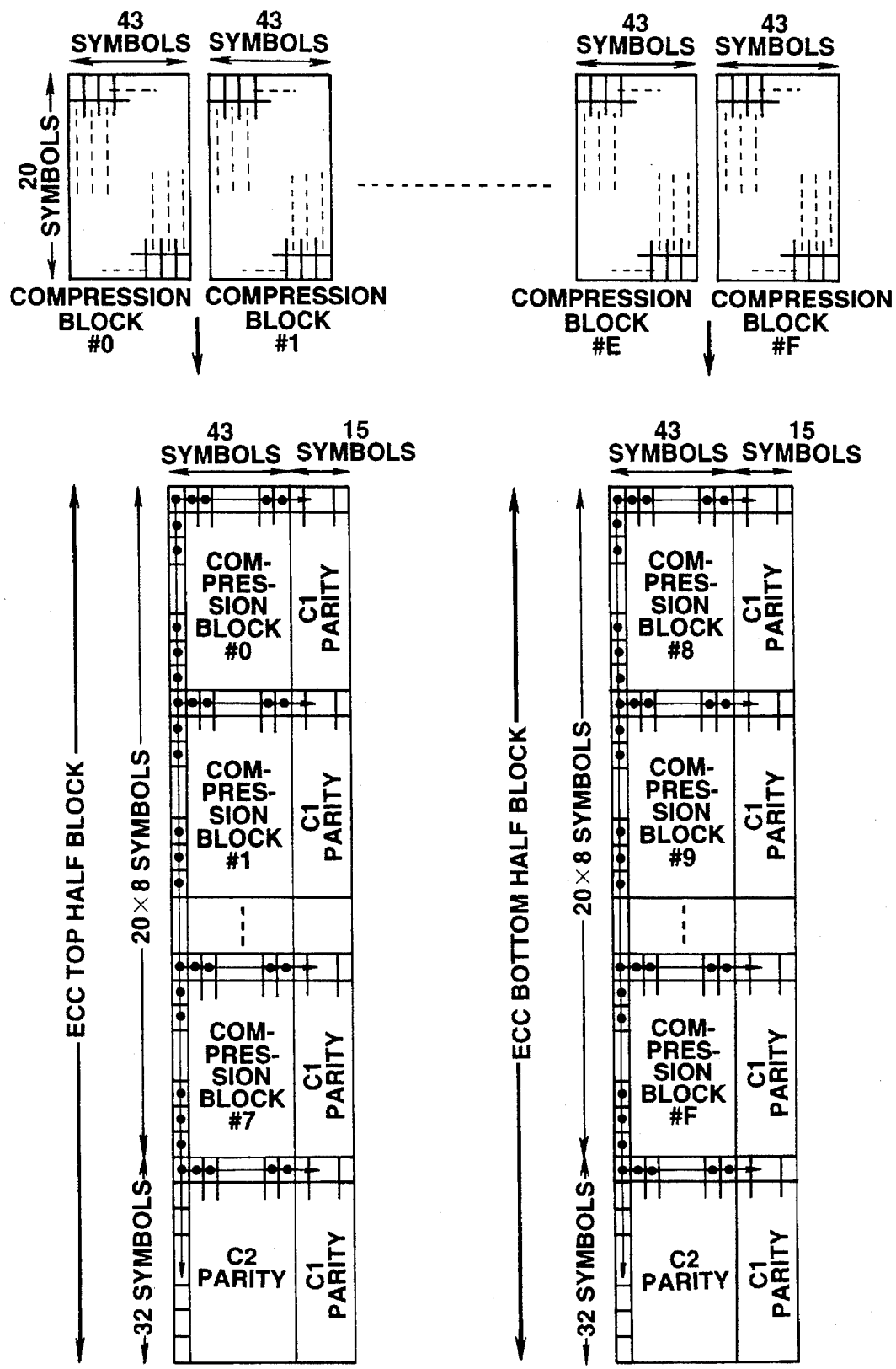
FIG. 14 shows the C1 parity appended for each compression block and the C2 parity appended at an interval of plural compression blocks.

In FIG. 14, eight compression processing blocks, #0 to #7, are arranged into the ECC top half block, and another eight compression processing blocks, #8 to #F, are arranged into the ECC bottom half block. Appended to each of the 16 compression processing blocks is a parity block C1, which enlarges each compression block by 15 symbols in the direction that is at right angles with the film running direction. Also, appended to the lead portion of the 8th and 16th compression processing blocks are C2 parity blocks, which comprise 32 symbols in the film running direction and 43 symbols in the direction at right angles with the film running direction.

In FIG. 15, the symbols of the ECC bottom half block are interleaved with the symbols of the ECC top half block. This interleaving process includes the symbols of the C2 and C1 parity blocks, along with the symbols of the compression processing blocks. This process produces sixteen film blocks, each film block comprising 24 symbols.

For example, film block #0 begins with symbol T000 from the ECC top half block, which is followed by symbol B000 from the ECC bottom half block. The next pair of symbols in film block #0 comprises symbol T001 and symbol B001. The next pair comprises symbol T002 and symbol B002. Subsequent pairs of symbols are added in a similar fashion until symbols T011 and B011 have been added. This pair marks the completion of film block #0.

Similarly, film block #1 is formed by sequentially pairing corresponding pairs from the bottom and top half blocks of the full ECC block. Symbol T012 is paired with symbol B012; symbol T013 is paired with symbol B013; and film block #1 is complete when symbol T023 has been paired with symbol B023.

Film blocks #2 to #15 are formed in a similar manner as just described.

When the film block is formed by such interleaving, the right and left channel digital sound tracks are recorded on the channel-by-channel basis.

Figure 16:
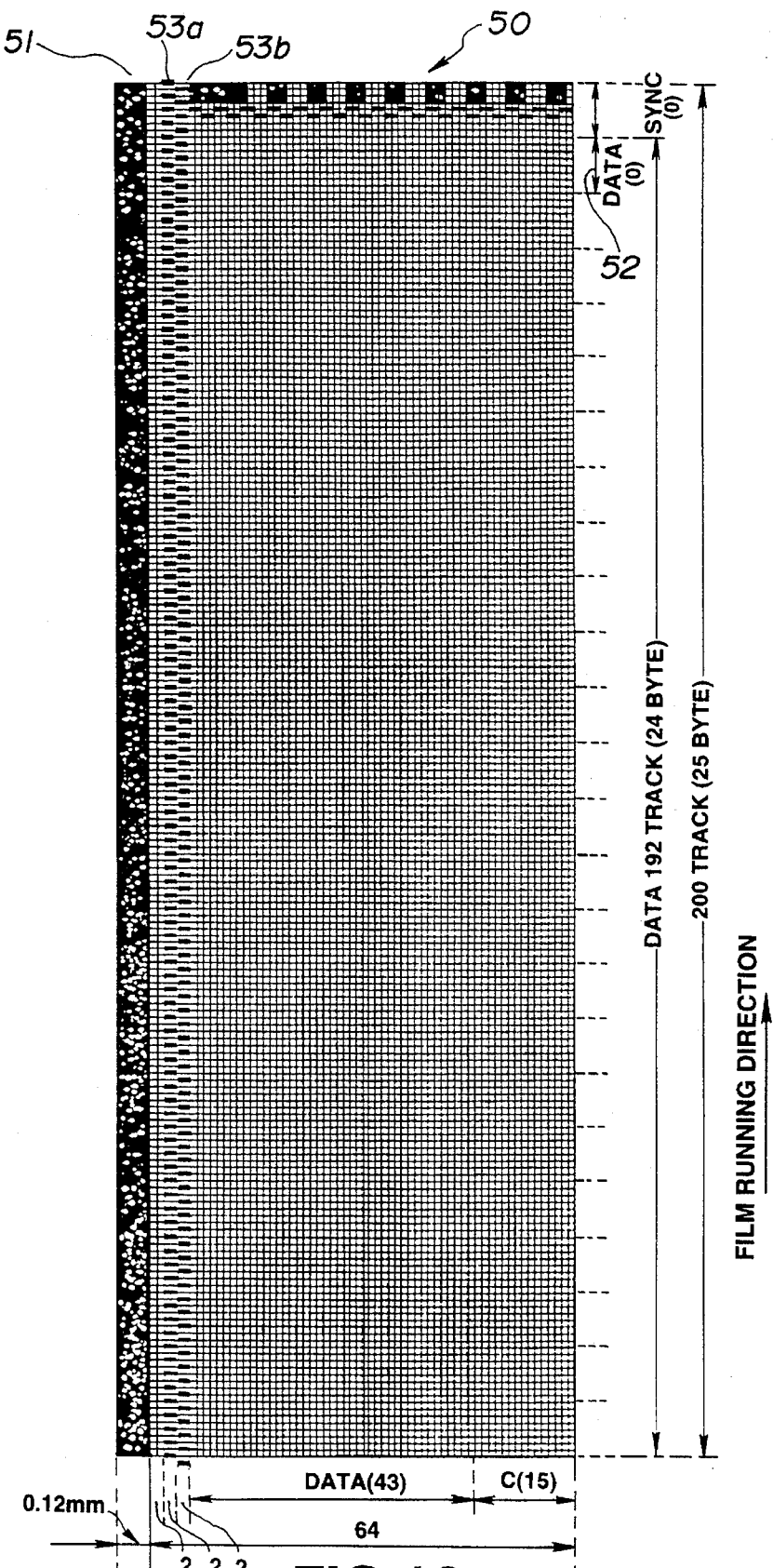
FIG. 16 illustrates the manner in which film blocks formed by such interleaving have been recorded on the motion picture film.

FIG. 16 illustrates how the film blocks of FIG. 15 are recorded onto the digital sound tracks of a motion picture film. The motion picture film in FIG. 16 includes leading end data 50, light-barrier regions 51 extending on one side of the digital sound tracks along the film running direction, the audio data, C1 parity and C2 parity extending at right angles to the film running direction in a side-by-side relation to the film running direction, and stripe-shaped tracking patterns 53a and 53b extending along the film running direction adjacent to the light barrier regions 51.

The tracking patterns 53a and 53b are a white/black repeat pattern that occurs at an interval of one dot along the film running direction. These tracking patterns are recorded with an offset of one half dot (track width) from the center of the data track along the film running direction.

FIG. 16 also illustrates 24 audio data bytes and 1 SYNC byte. Each data byte 52 comprises 8 bits, which extend along the film running direction. This arrangement of bytes is applicable to any or all of the compression processing blocks illustrated in FIGS. 5, 7, 9 and 11. With respect to error correction, Reed-Solomon coding can be used on any such eight bit data bytes, regardless of whether only one bit error or as many as eight bit errors exist in any such byte. Since scratches on the motion picture film appear most frequently along the film running direction as the film is repeatedly reproduced, arranging the bytes in the film running direction avoids the disadvantages that exist when error correction is performed on bytes that are aligned in a normal direction to the scratches.

Figure 17:
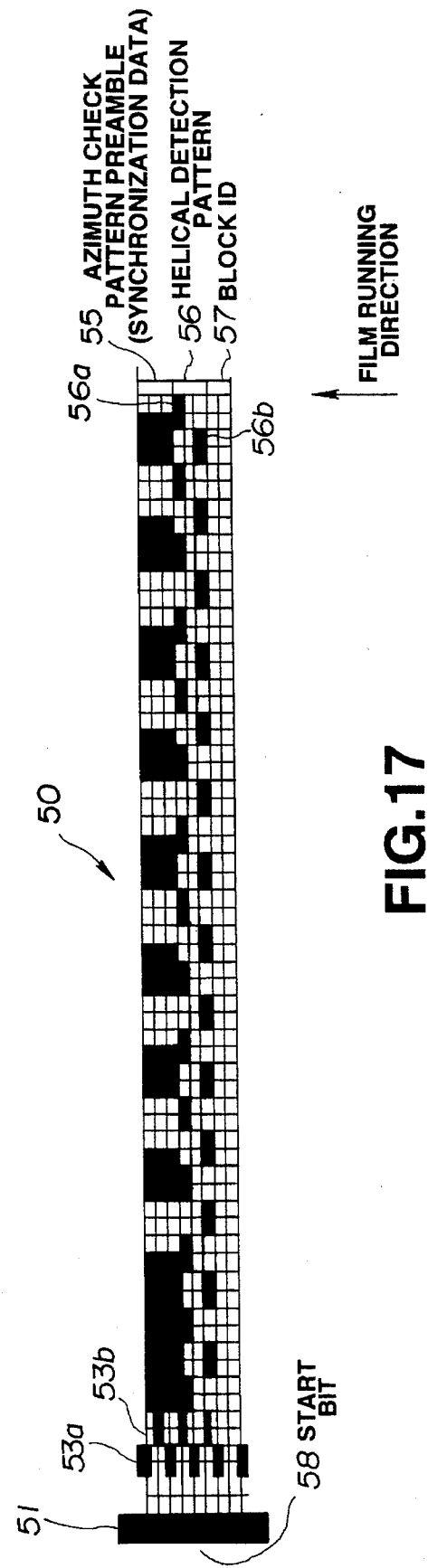
FIG. 17 shows the leading end data recorded on the motion picture film.

As shown in FIG. 17, the leading end pattern 50 includes the preamble (synchronization data) 55, which is recorded as three dots in the film running direction. The azimuth check pattern 56 comprises a 2-dot white/black repeat pattern 56a recorded in a direction at right angles to the film running direction and 2-dot white/black repeat pattern 56b recorded with an offset of 2 dots with respect to the repeat pattern 56a in a direction at right angles to the film running direction. Thereafter, the block ID57 is recorded.

Figure 18:
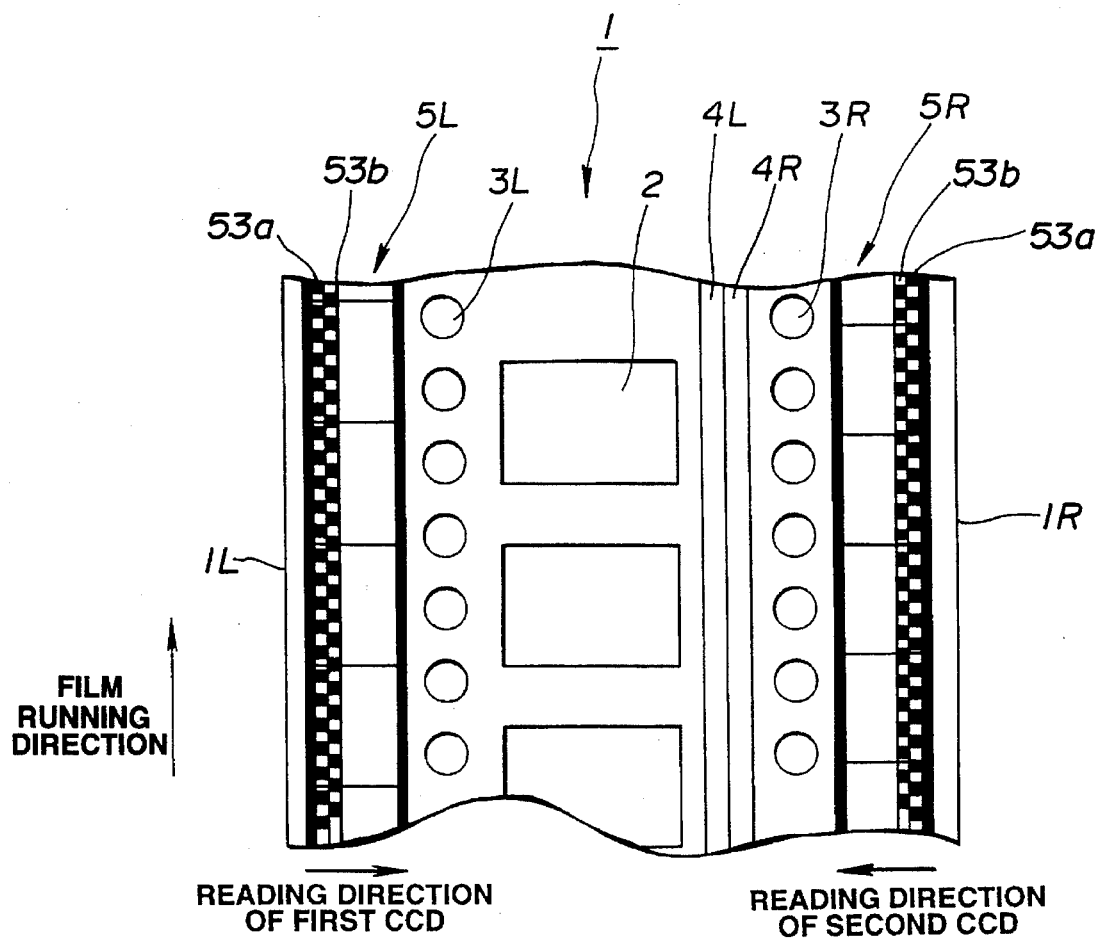
FIG. 18 illustrates film blocks symmetrically recorded on the right-channel digital sound track and the left-channel digital sound track of the motion picture film.

With respect to the motion picture film 1, FIG. 18 shows that the right channel digital sound track 5R and the left channel digital sound track 5L are recorded symmetrically about each film region 2 of the picture recording area. The tracking patterns 53a and 53b are recorded on sound track 5L so that the tracking patterns 53a and 53b are on the left edge 1L of the film 1, while the tracking patterns 53a and 53b are recorded on the sound track 5R so that the tracking patterns 53a and 53b are on the right edge 1R of the film 1. During reproduction, the left channel digital sound track 5L is read from the left edge 1L of the film 1, while the right channel digital sound track 5R is read from the right edge 1R of the film 1.

Figure 19:
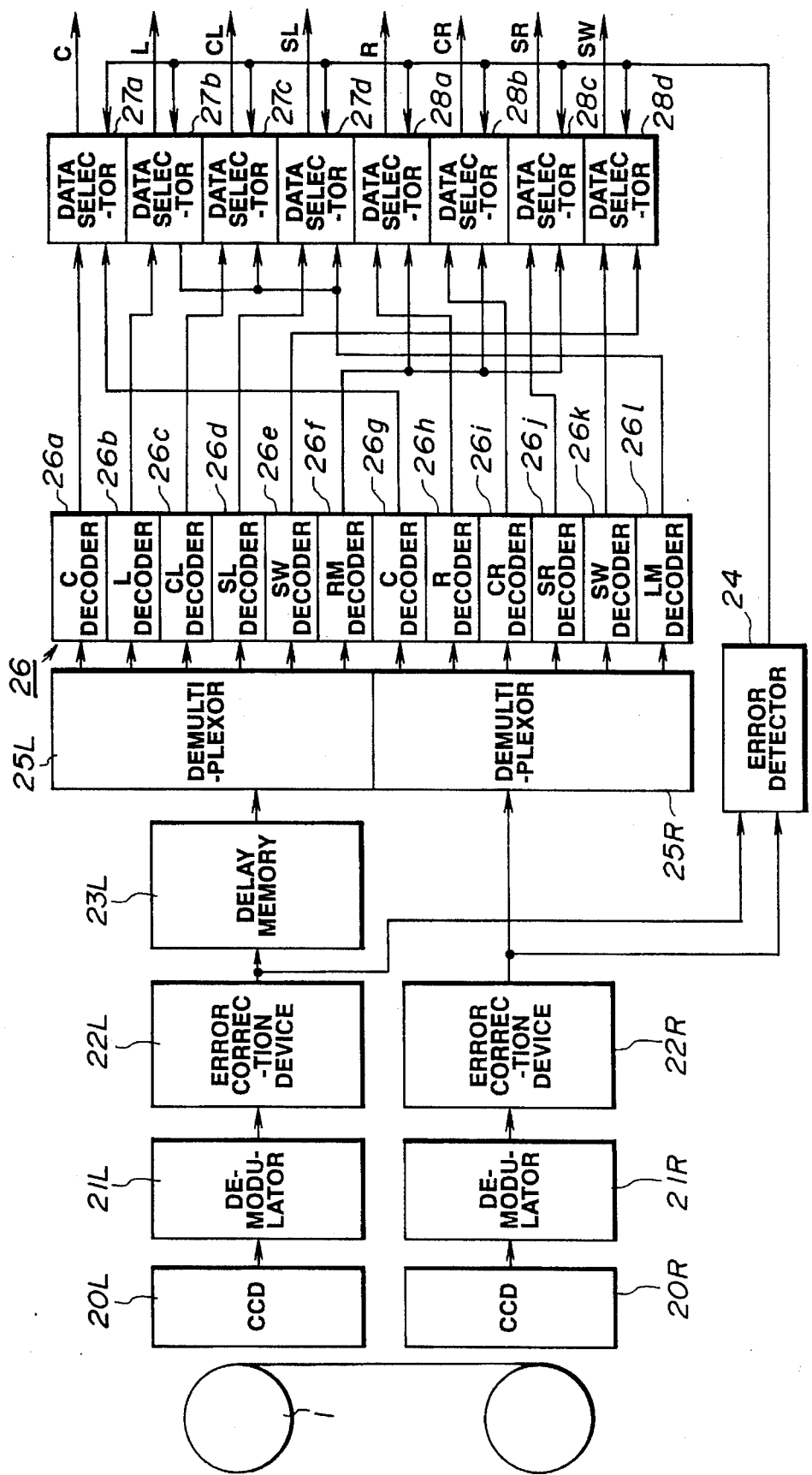
FIG. 19 is a block diagram showing a reproducing system of the motion picture film shown in FIG. 1.

FIG. 19 illustrates a motion picture film reproducing apparatus for reproducing audio data from the motion picture film 1. This apparatus comprises first and second CCD line sensors 20L and 20R, demodulator 21L for demodulating left route audio data read by the first CCD line sensor 20L, and demodulator 21R for demodulating right route audio data read by CCD line sensor 20R.

The motion picture reproducing apparatus also comprises error correcting circuit 22L for error-correcting left-route audio data from demodulator 21L, error correcting circuit 22R for error-correcting right-route audio data from demodulator 21R, delay memory 23L for delaying the left-route audio data from error correcting circuit 22L and error flag detector 24 for detecting an error flag generated if either or both error correcting circuits 22L and 22R cannot perform error correction.

The motion picture film reproducing apparatus further comprises demultiplexer 25L for generating the left-route audio data in parallel out of a serial signal supplied from delay memory 23L, demultiplexer 25R for generating the right-route audio data in parallel out of a serial signal supplied from the error correcting circuit 22R, and decoders 26a to 26l for decoding the left and right route audio data from demultiplexers 25L and 25R.

The motion picture film reproducing apparatus also includes data selectors 27a to 27d for selecting and outputting left-route audio data based on the detection output of error detection circuit 24. Data selectors 28a to 28d select and output right-route audio data based on the detection output of error detection circuit 24.

The above-described motion picture film reproducing apparatus operates as follows.

When film reproduction begins, CCD line sensors 20L and 20R optically read the audio data recorded on the digital sound tracks 5L and 5R. CCD line sensor 20L reads the left route audio data line-by-line towards picture region 2 from the left edge 1L in a direction at right angles to the film running direction. CCD line sensor 20L then supplies the left channel audio data to demodulator 21L, as shown in FIG. 19. CCD line sensor 20R reads out the right route audio data line-by-line towards picture region 2 from the right edge 1R in a direction at right angles to the film running direction. CCD line sensor 20R then supplies the data to demodulator 21R, as shown in FIG. 19.

The tracking error correction capability increases when the tracking patterns are recorded on both sides of each digital sound track 5L and 5R. However, providing tracking patterns on both sides of the sound data tracks reduces the audio data recording region. In this embodiment, the tracking patterns 53a and 53b are provided at only one side of each of the digital sound tracks 5L and 5R. Therefore, the audio data recording region is wider than it would be if tracking patterns 53a and 53b were provided on both sides of each data track.

As FIG. 18 illustrates, tracking patterns 53a and 53b are recorded near the edges 1L and 1R of the motion picture film 1. Since CCD line sensors 20L and 20R begin reading data at edges 1L and 1R, respectively, and gradually move width-wise across digital sound tracks 5L and 5R, respectively, the tracking patterns may be read without being obstructed by the take-up holes 3L and 3R. This assures correct data reproduction.

Demodulators 21L and 21R demodulate the left and right route audio data and supply the demodulated data to error correction circuits 22L and 22R, respectively.

Error correction circuit 22L performs error correction on the left route audio data, using the C1 parity and C2 parity blocks. Error correction circuit 22L then provides the error-corrected data to delay memory 23L, while generating an error flag if such error correction cannot be made and providing the error flag to error flag detector circuit 24.

Error correction circuit 22R performs error correction on the right route audio data, using the C1 parity and C2 parity blocks. Error correction circuit 22R then provides the error-corrected data to demultiplexer 25R, while generating an error flag if such error correction cannot be made and providing the error flag to error flag detector 24.

Among the scratches generated on the motion picture film 1, are longitudinal scratches extending in the film running direction and transverse scratches extending at right angles to the film running direction. The longitudinal scratches are produced more frequently than the transverse scratches as the film 1 is used repeatedly. Longitudinal scratches ruin less audio data bytes when the bytes are recorded along the film running direction than when they are recorded at right angles to the film running direction.

The C1 parity block performs error correction in a direction at right angles to the film running direction to correct errors caused by the longitudinal scratches. The C2 parity block corrects errors caused by transverse scratches or caused by data that are faintly read as a result of defocusing. Thus, accurate audio data reproduction is possible with the motion picture film 1 and the motion picture reproducing apparatus of the present embodiment.

Figure 20:
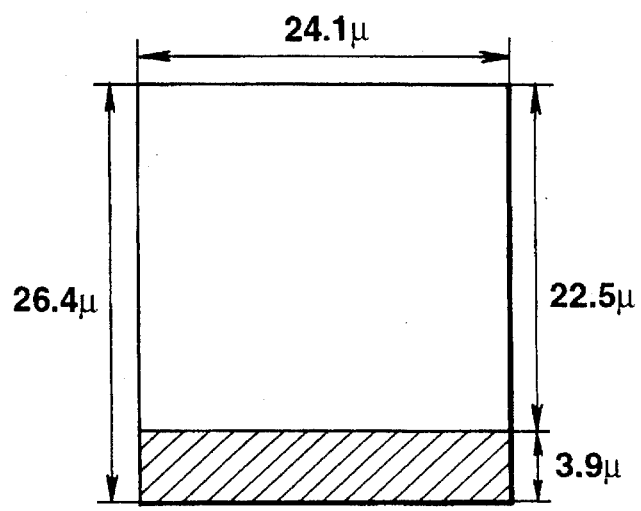
FIG. 20 shows a dot size of each data recorded on the motion picture film shown in FIG. 1.
Figure 21:
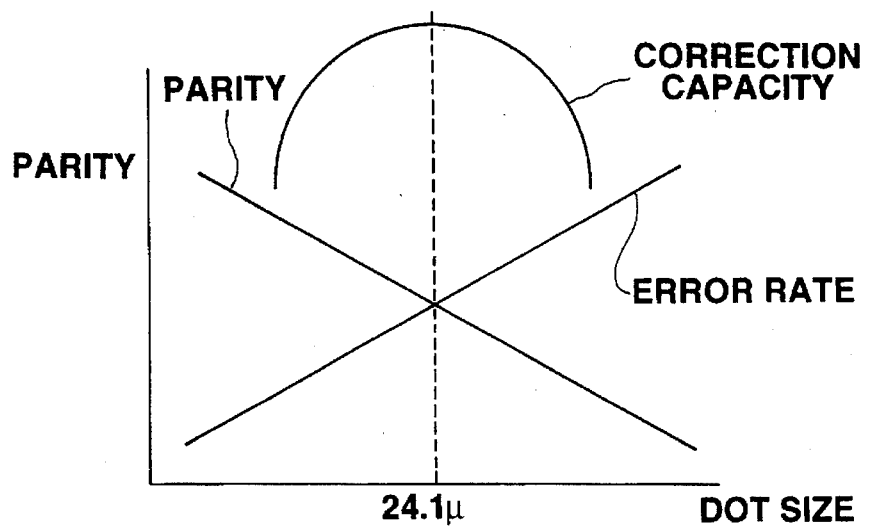
FIG. 21 is a graph showing the relation between the dot size and the error correction capability.

The audio data dot on the motion picture film 1 is recorded with a size of 26.4 μ×24.1 μ, as shown in FIG. 20. The relation between the dot size and the parity is as shown in FIG. 21, from which it is seen that as the dot size becomes larger, the error rate improves. When the dot size is reduced, more parity data needs to be appended. On the other hand, the error correction capability delineates a quadratic curve with the transverse dot size of 24.1 μ, as an apex. Since the recording is made with the motion picture film of the present embodiment with a dot size of 26.4 μ×24.1 μ, the dot size corresponds to the maximum error correcting capability, thereby contributing to accurate reproduction of the audio data.

The left-route and right-route audio data recorded on the motion picture film 1 are recorded with a shift of 17.8 frames. Thus, the delay memory 23L delays the left-route audio data by 17.8 frames to match the timing with the right route audio data. The resulting delayed data is supplied to the demultiplexer 25L, as shown in FIG. 19.

Demultiplexer 25L then supplies to decoders 26a to 26f the center channel audio data C, left channel audio data L, center left channel audio data CL, left surround audio data SL, sub-woofer audio data SW, and right mix channel audio data RM.

Error correction device 22R serially supplies the right route audio data to demultiplexer 25R. Demultiplexer 25R then supplies to decoders 26g to 26l the center channel audio data C, right channel audio data R, center right channel audio data CR, right surround audio data SR, sub-woofer audio data SW, and left mix channel audio data LM.

Decoders 26a to 26d decode the left route audio data C, L, CL and SL with high efficiency decoding, and route the resulting decoded data to left route data selectors 27a to 27d. Decoder 26e decodes the left route audio data SW with high efficiency decoding and supplies the resulting data to right route data selector 28d. Decoder 26f decodes the left route audio data RM with high efficiency decoding and supplies the resulting data to right route data selectors 28a to 28c.

Decoder 26g decodes the right route audio data C with high efficiency decoding and provides the resulting data to left route data selector 27a. Decoders 26h to 26k decode the right route audio data R, CR, SR and SW with high efficiency decoding, and provide the resulting decoded data to right route data selectors 28a to 28d. The decoder 26l decodes the right route audio data LM with high efficiency decoding and provides the resulting data to data selectors 27b to 27d.

Data selectors 27a to 27d and 28a to 28d are all supplied with a detection output of the error detection circuit 24. Thus, based on the detection output, data selectors 27a to 27d and 28a to 28d can detect the data for which error correction has not been performed. Data selectors 27a to 27d and 28a to 28d are each supplied with two audio data signals and each selector selectively outputs only the audio data for which error correction has been performed.

For example, data selector 27a is supplied with the left route and right route center channel audio data. Data selector 27a then selectively outputs only the center channel audio data that has been corrected for errors. Similarly, data selector 27b selectively outputs whichever one of the left channel audio data and the left mix channel audio signals that has been corrected for errors. Data selector 27c selectively outputs whichever one of the left center channel audio data and the left mix channel audio data that has been corrected for errors. Data selector 27d selectively outputs whichever one of the left surround audio data and the left mix channel audio data that has been corrected for errors.

Data selector 28a selectively outputs whichever one of the right channel audio data and the right mix channel audio data that has been corrected for errors. Data selector 28b selectively outputs whichever one of the right center channel audio data and the right mix channel audio signals that has been corrected for errors. Data selector 28c selectively outputs whichever one of the surround right channel audio data and the right mix channel audio data that has been corrected for errors. Data selector 28d selectively outputs the sub-woofer channel audio data that has been corrected for errors.

If any data selector receives two input data signals that have been corrected for errors, then such a data selector outputs a predetermined one of the input data signals. If a data selector receives two input data signals that have not been error corrected, then such a data selector does not output either input data signal.

With respect to FIG. 22, the right mix channel audio data RMn, which is mixed from the right channel R, the center right channel CR, and the surround right channel SR, is recorded on the left channel digital sound track 5L on which the left route audio data SLn, Ln and CLn are recorded. The left mix channel audio data LMn, mixed from the left channel L, center left channel CL and the surround left channel SL, is recorded on the right channel digital sound track 5R on which the right route audio data SRn, Rn and CRn are recorded. The audio data of the respective channels recorded on the digital sound track 5R are recorded with a time difference with respect to the audio data of the corresponding respective channels recorded on the digital sound track 5L.

Consequently, even if an extremely long burst error occurs in one of the digital sound tracks, such as 5L, and even if there is an error on the opposite side digital sound track 5R, the left route signals may still be generated from the mixed audio data LMn because the mixed audio data LMn is mixed from the audio data L, CLn and SLn.

With respect to FIG. 22, let it be assumed that scratches on the film have rendered frames Cn+α, Ln+α, CLn+α, SLn+α, SWn+α and RMn+α of the left route unreproducible, and these scratches have also rendered frames Cn, Rn, CRn, SRn, SWn and LMn of the right route unreproducible. Nevertheless, the reproducing apparatus is still capable of reproducing the data contained in these unreproducible frames. For example, the data at position (n) was recorded not only at the right route, where this data was wiped out by the scratches, but related data also was recorded in the left route, at a film position left unmarked by the scratches. Therefore, since the data at position (n) was preserved by the left route, left route decoders 26a to 26f can decode this data. Similarly, since related data at position (n+α) was recorded in the right route, which was unmarked by the scratches, right route decoders 26g to 26l can decode this data even though the scratches wiped out the left route's copy of the data at position (n+α).

By recording audio data in two routes, the audio data is reproducible even if the decoding by one of the route's decoders is not possible because decoding by the other route's decoders will be possible. Therefore, interruptions in the sound generated by the reproducing apparatus will be minimized more effectively.

Figure 23:
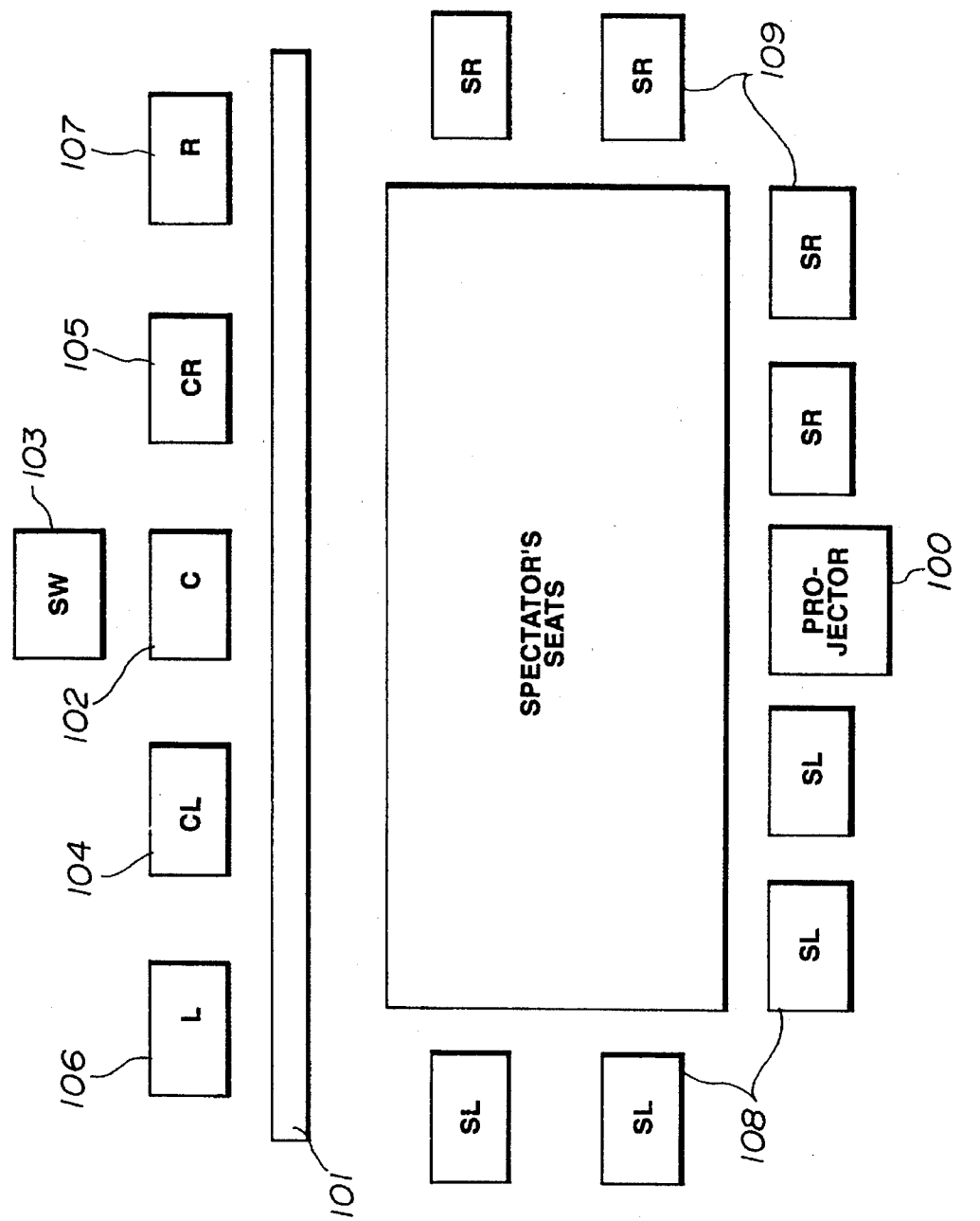
FIG. 23 illustrates an arrangement of speakers in a movie theater for generating an acoustic output of the audio data recorded on the motion picture film shown in FIG. 1.

FIG. 23 illustrates an arrangement of speakers in a movie theater. This arrangement of speakers, together with the eight-channel digital sound system, produces a sound field that is rich in ambience.

When a movie is reproduced from the motion picture film 1, six of the eight channels of the recorded audio data are converted into sound by a center speaker 102, a sub-woofer 103, a center left speaker 104, a center right speaker 105, a left speaker 106 and a right speaker 107. These speakers are arranged on the side of a screen 101 on which a picture reproduced from the picture recording area 2 of the motion picture film 1 is projected by a projector 100. The remaining two channels of audio data are converted into sound by surround right speakers 109 and surround left speakers 108, which are arranged on the side of the projector 100.

The center speaker 102 is at a center position behind the screen 101; center speaker 102 outputs the playback sound recorded as audio data C of the center channel. The center audio data records important sounds, such as the film characters' dialogues.

The sub-woofer 103 is behind the center speaker 102. The sub-woofer 103 outputs the playback sound recorded as audio data SW of the sub-woofer channel. This channel records sounds of vibrations, such as explosions. This present digital audio system thus reproduces the sound of explosions with outstanding effects.

The left speaker 106 and the right speaker 107 are on the left and right sides of the screen 101, respectively, and output the sound recorded by the left-channel audio data L and the right-channel audio data R. These speakers produce stereophonic effects.

The center left speaker 104 is between the left speaker 106 and the center speaker 102. The center right speaker 105 is between the right speaker 107 and the center speaker 102. Center left speaker 104 outputs the playback sound recorded as the center left channel audio data CL, and the center right speaker 105 outputs the playback sound recorded as the center right channel audio data CR. In a motion picture theater having a large-format screen and capable of holding a large number of guests, these speakers assist the left speaker 106 and the right speaker 107 by creating a more realistic fixed position feeling of the sound image. Without the center left and center right speakers, the fixed position feeling of the sound image becomes unstable depending on the seat position.

The surround left speakers 108 and the surround right speakers 109 are behind and to the side of the spectator's seats, and they reproduce the playback sound recorded as the audio data SL of the surround left channel and the playback sound recorded as the audio data SR of the surround right channel, respectively. The arrangement of the surround speakers gives the spectator the impression of being encircled by the reverberating sound or jubilee. This creates a more stereophonic sound image.

Figure 24:
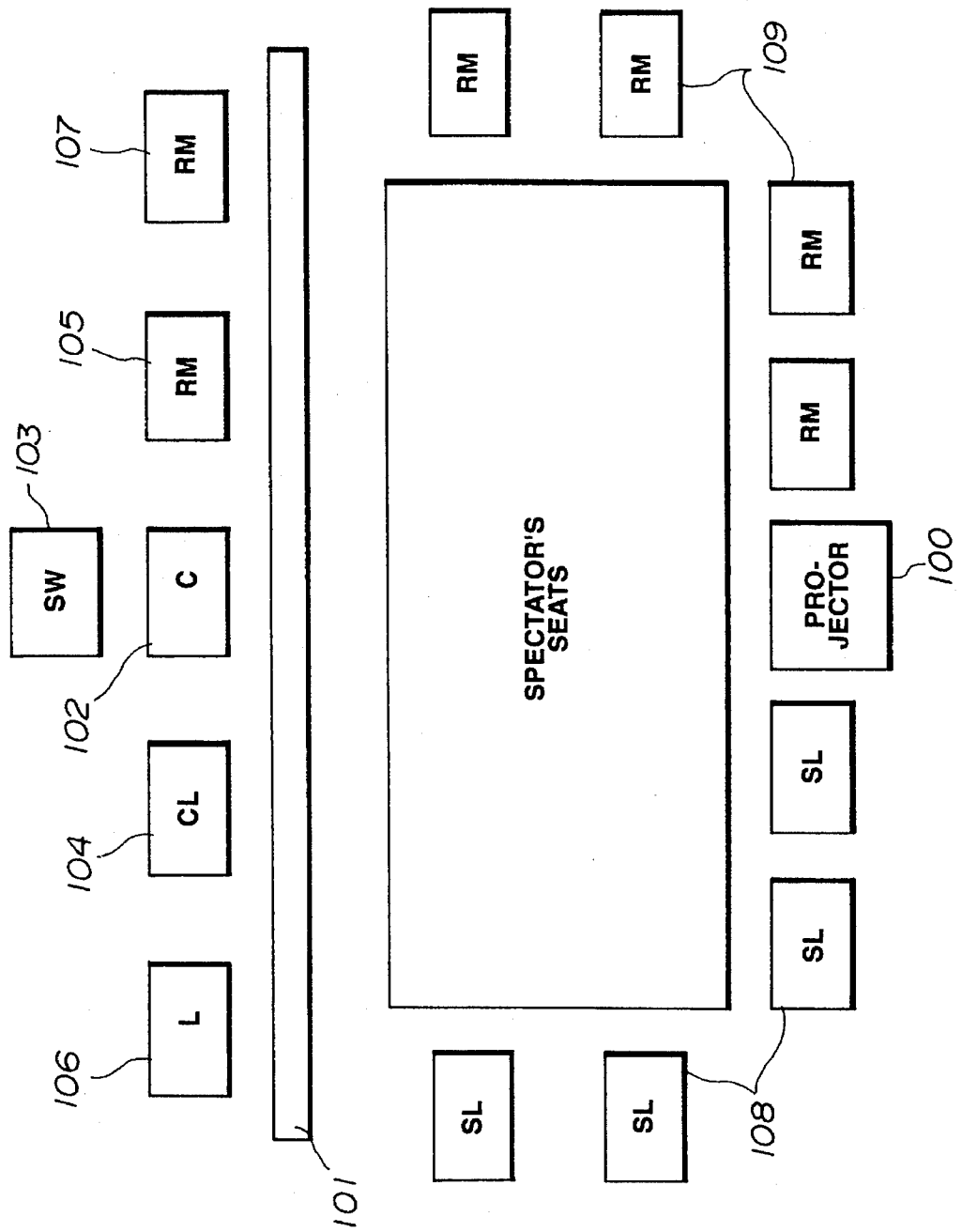
FIG. 24 illustrates another arrangement of speakers in a movie theater for generating an acoustic output of the audio data recorded on the motion picture film shown in FIG. 1.

If only audio data of the left digital sound track is reproduced, as shown in FIG. 24, the center right speaker 105, right speaker 107 and the surround right speaker 109 reproduce the playback sound that is recorded as mixed audio data RM of the center right channel (CR), right channel (R) and the surround right channel (SR). Therefore, even if the sound of the right route becomes completely unreproducible, the reproducing system will nevertheless provide a sound effect that is similar to the sound effect produced normally, thereby avoiding any sound interruption.

Figure 25:
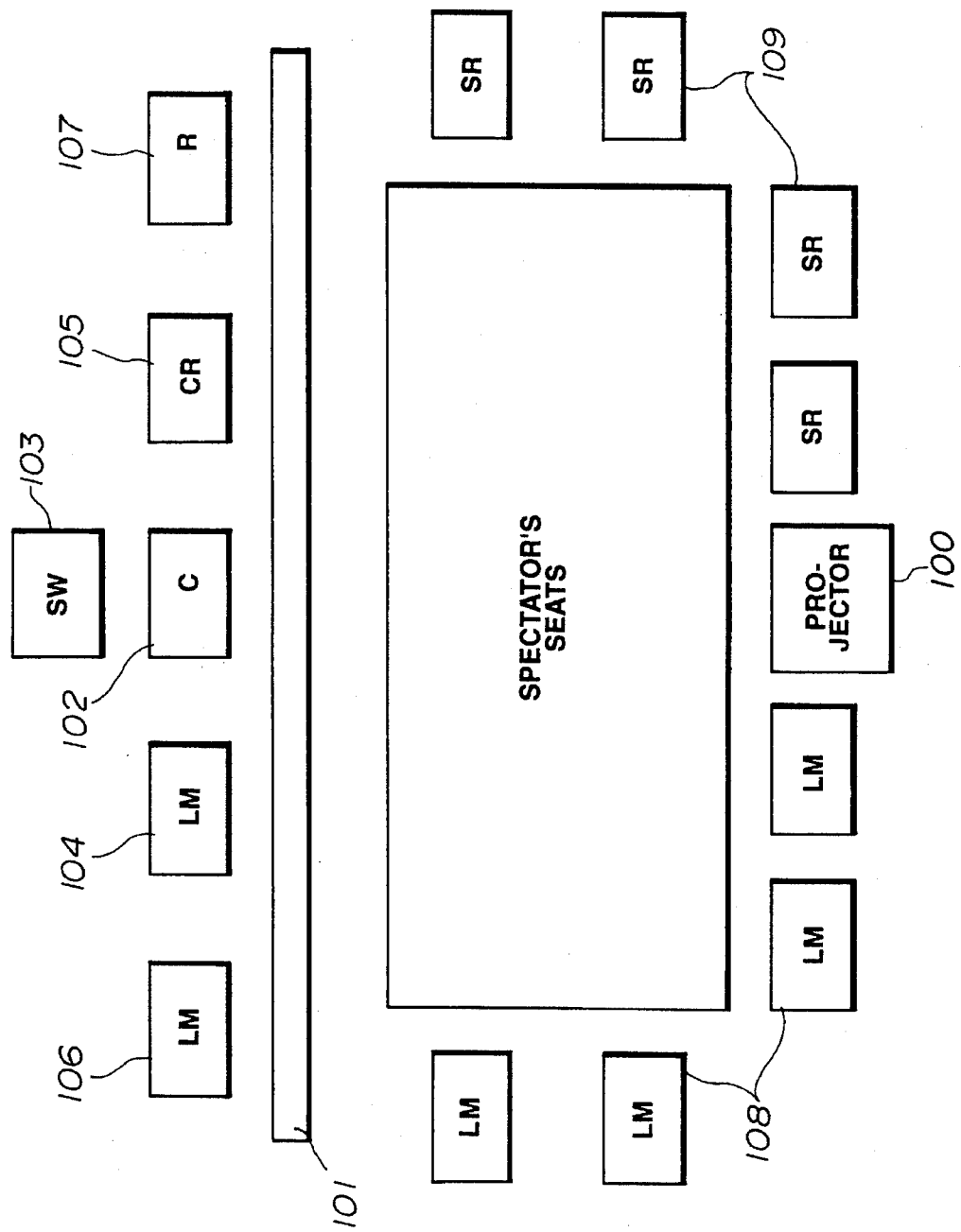
FIG. 25 illustrates still another arrangement of speakers in a movie theater for generating an acoustic output of the audio data recorded on the motion picture film shown in FIG. 1.

If only audio data of the right digital sound track is reproduced, as shown in FIG. 25, the center left speaker 104, left speaker 106 and the surround left speaker 108 reproduce the playback sound that is recorded as mixed audio data LM of the center left channel (CL), left channel (L) and the surround left channel (SL). Therefore, even if the sound of the left route becomes completely unreproducible, the reproducing system will nevertheless provide a sound effect similar to the sound effect produced normally, thereby avoiding any sound interruption.

Figure 26A:
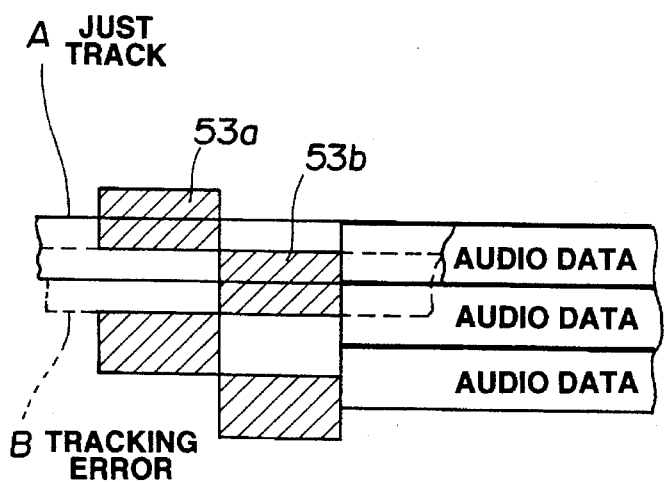
FIGS. 26(a) and 26(b) illustrate the tracking error of the CCD line sensor for reproducing audio data from the motion picture film shown in FIG. 1.
Figure 26B:
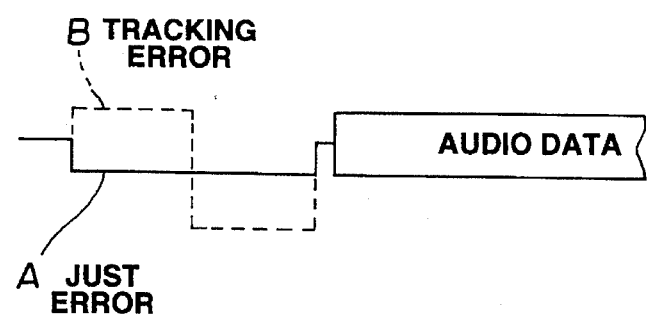

In FIG. 26, a solid line A illustrates the path scanned by the CCD line sensors when they are correctly aligned with the digital audio tracks. Since the track patterns 53a and 53b are recorded in positions that are 90° out of phase with respect to the audio data tracks along the film running direction, the CCD line sensor 20L reproduces only an upper half or a lower half of each of the tracking patterns 53a and 53b. Thus, the reproduced signals of the tracking patterns 53a and 53b maintain the upper or lower half, as indicated by the solid line A in FIG. 26b.

Conversely, if the CCD line sensors are offset from path A, as shown by broken lines B in FIG. 26a, the tracking patterns 53a or 53b are reproduced substantially in their entirety. Thus, the reproduced signals of the tracking patterns 53a and 53b are swung vertically responsive to the white and black dots, as indicated by broken line B in FIG. 26b, while reaching a signal level approximately twice the on-track level.

Thus, with the motion picture film reproducing apparatus, these characteristics are utilized for correcting the readout timing of the CCD line sensors 20L and 20R and for correcting the tracking error.

Figure 27:
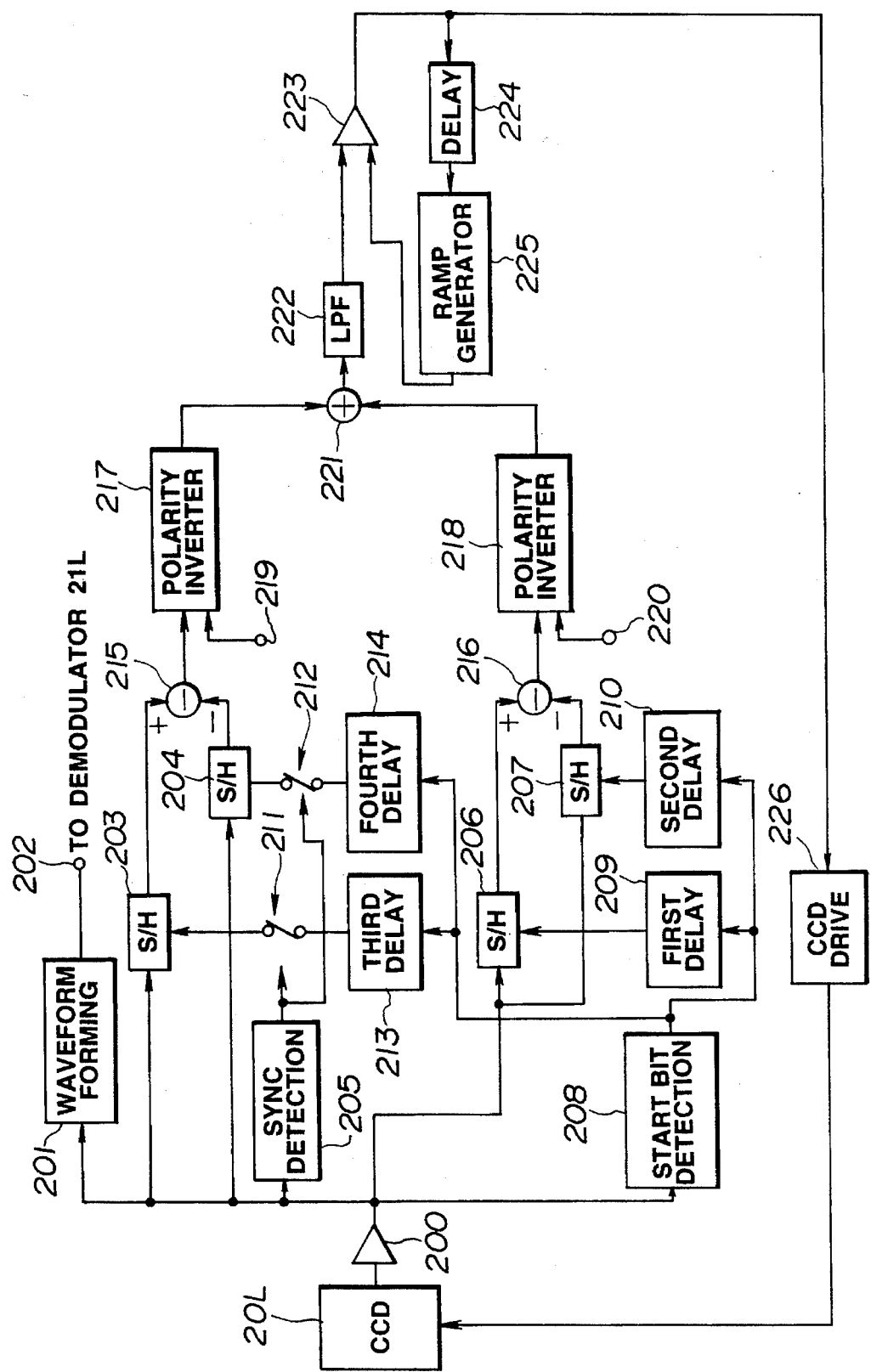
FIG. 27 is a block diagram showing the tracking error system of the reproducing system of the motion picture film shown in FIG. 1 for controlling the readout timing of the CCD line sensor for correcting the tracking error.
Figure 28:
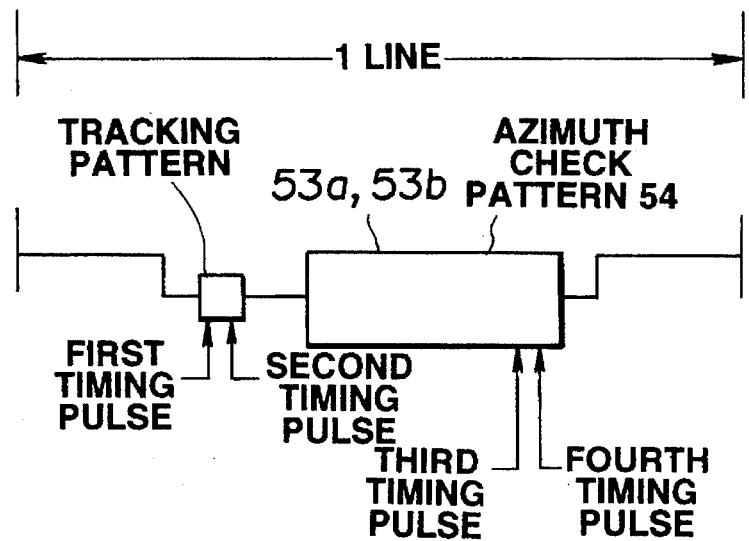
FIG. 28 illustrates the timing of sample-holding the tracking pattern and the tilt detection pattern by the tracking error system.

FIG. 27 illustrates the left-route tracking error correction system for the motion picture film reproducing apparatus. The right-route channel tracking error correction system is configured in a similar manner. Consequently, the following explanation is directed to the operation of the left-route tracking error correction system, while that for the right-route tracking error correction system is omitted.

The tracking patterns 53a and 53b and audio data read out by CCD line sensor 20L are supplied via an amplifier circuit 200 to a waveforming circuit 201, sample-and-hold circuits 203, 204, 206, 207, a synchronization detection circuit 205, and a start bit detection circuit 208.

The waveform shaping circuit 201 shapes the data into a shaped rectangular wave, which is fed via an output terminal 202 to the demodulator 21L.

The start bit detection circuit 208 detects the start bit 58, which is illustrated in FIG. 17. Start bit detection circuit 208 then generates a detection output and routes it to delay circuits 209, 210, 213, and 214.

First delay circuit 209 delays the detection output of the start bit. The delayed detection output is supplied as a first timing pulse to the sample-and-hold circuit 206. Thus, tracking pattern 53a is sampled-and-held by circuit 206 in accordance with this delayed detection output.

The detection output of the start bit is also delayed by second delay circuit 210. The delayed detection output is supplied as a second timing pulse to the sample-and-hold circuit 207. Thus, tracking pattern 53b is sampled-and-held by circuit 207 in accordance with this delayed detection output.

The detection output of the start bit is also delayed by third delay circuit 213. The delayed detection output is then supplied as a third timing pulse to the sample-and-hold circuit 203 via switch 211. Thus, the 2-dot white/black repeat pattern 56a of azimuth check pattern 56 is sampled-and-held by circuit 203 in accordance with this delayed detection output.

The detection output of the start bit is also delayed by fourth delay circuit 214. The delayed detection output is then supplied as a fourth timing pulse to the sample-and-hold circuit 204 via switch 212. Thus, the 2-dot white/black repeat pattern 56b of azimuth check pattern 56 is sampled-and-held by circuit 204 in accordance with this delayed detection output.

The synchronization data (preamble) 55 shown in FIG. 17 is detected by the synchronization detection circuit 205, which then forms high-level data only during a playback time of the azimuth check pattern 56. The high-level data is then transmitted to the switches 211 and 212.

The switches 211 and 212 turn on when supplied with this high-level data. When switches 211 and 212 turn on, they route the third and fourth timing pulses from the third and fourth delay circuits 213 and 214 to the sample-and-hold circuits 203 and 204, respectively.

The sample-and-hold circuit 206 samples-and-holds the tracking pattern 53a in accordance with the first timing pulse which is generated by the first delay circuit 209. Sample-and-hold circuit 206 then routes the tracking pattern 53a to subtractor 216.

The sample-and-hold circuit 207 samples-and-holds the tracking pattern 53b in accordance with the second timing pulse, which is generated by the second delay circuit 210. Sample-and-hold circuit 207 then routes the tracking pattern 53b to the subtractor 216.

The sample-and-hold circuit 203 samples-and-holds the 2-dot white/black repeat pattern 56a of the azimuth check pattern 56 in accordance with the third timing pulse, which is generated by the third delay circuit 213. Sample-and-hold circuit 203 then routes the 2-dot white/black repeat pattern 56a to the subtractor 215.

The sample-and-hold circuit 204 samples-and-holds the 2-dot white/black repeat pattern 56b of the azimuth check pattern 56 in accordance with the fourth timing pulse, which is generated by the fourth delay circuit 214. Sample-and-hold circuit 204 then routes the 2-dot white/black repeat pattern 56b to the subtractor 215.

The subtractor 216 detects the difference between the tracking pattern 53a and the tracking pattern 53b. Subtractor 216 then routes the detected difference to a polarity inverter 218.

The subtractor 215 detects the difference between the 2-dot white/black repeat pattern 56a and the 2-dot white/black repeat pattern 56b of the azimuth check pattern 56. Subtractor 215 then routes the detected difference to a polarity inverter 217.

The polarity inverters 217 and 218 are also supplied with polarity inverting data via input terminals 219 and 220, respectively. The polarity inverters 217 and 218 invert the detected differences supplied by subtractors 215 and 216, respectively, in accordance with the polarity inverting data. Polarity inverters 217 and 218 then route their respective inverted outputs to an adder 221.

The adder 221 adds the inverted differences received from inverters 217 and 218. The resulting sum represents an error of the readout timing of the CCD line sensor 20L. This error is based on the detected tracking patterns 53a and 53b and the azimuth check pattern 56. The summed data is fed via a low-pass filter 222 to a comparator 223.

Figure 29:
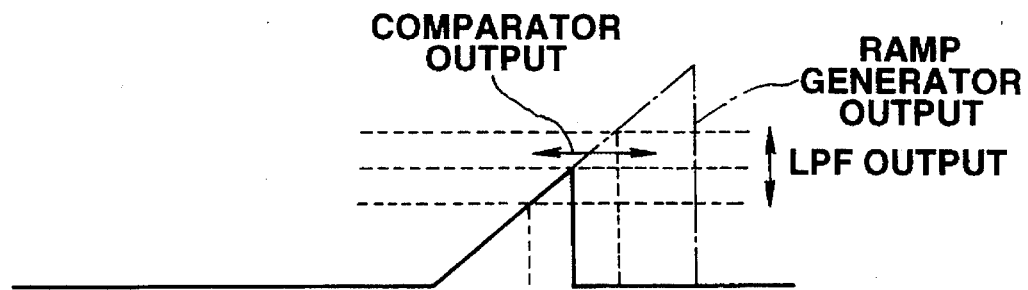
FIG. 29 is a graph showing a driving pulse of the CCD line sensor formed by the tracking error correction system.

The output of the comparator 223 is fed via a delay device 224 to a ramp generator 225, which transmits a serrated wave to the comparator 223. The chain-dotted line in FIG. 29 illustrates the amplitude of the serrated wave. As discussed above, the sum generated by adder 221 represents the readout timing error of CCD line sensor 20L. This sum is supplied to low-pass filter 222, which supplies its output to comparator 223. Therefore, the output of comparator 223 is responsive to the readout timing error of CCD line sensor 20L. Since the output of comparator 223 controls the output of ramp generator 225 via delay device 224, the output of ramp generator 225 is responsive to the readout timing error of CCD line sensor 20L. Furthermore, since comparator 223 is also responsive to ramp generator 225, the comparator 223 outputs a serrated wave corresponding to a readout timing error of the CCD line sensor 20L, as shown in FIG. 29. This serrated wave is fed to both the delay circuit 224 and to a CCD driving circuit 226.

The CCD driving circuit 226 controls the readout timing of the CCD line sensor 20L in accordance with the serrated wave supplied by comparator 223, which is responsive to the readout timing error of CCD line sensor 20L.

Thus CCD line sensor 20L may read out the respective audio data from the motion picture film 1, while tracking correction is executed so that the readout timing of the CCD line sensor 20L is in the just-tracking state at all times.

With the motion picture film 1 of the present embodiment, the tracking patterns 53a and 53b are recorded only on one side of each of the digital sound tracks 5L and 5R in order to increase the available data area. Normally, if the tracking error is recorded on only one side of each of the digital sound tracks 5L and 5R, the tracking error correction capability is lowered. However, this result is avoided by the azimuth check pattern 56. Recording an azimuth check pattern 56 on the motion picture film 1 allows the reproducing apparatus to correct the tracking error on the basis of both the azimuth check pattern 56 and the tracking patterns 53a and 53b. Thus, using the azimuth check pattern 56 in conjunction with the tracking patterns 53a and 53b permits the recording area for the audio data to be increased without lowering the tracking error correction capability.

Although the transverse dot size of the data is 24.1 μ in the above description, it may be varied with a nominal size of about 24μ, such as 23.9μ, 24.0μ or 24.2μ.

Figure 30:
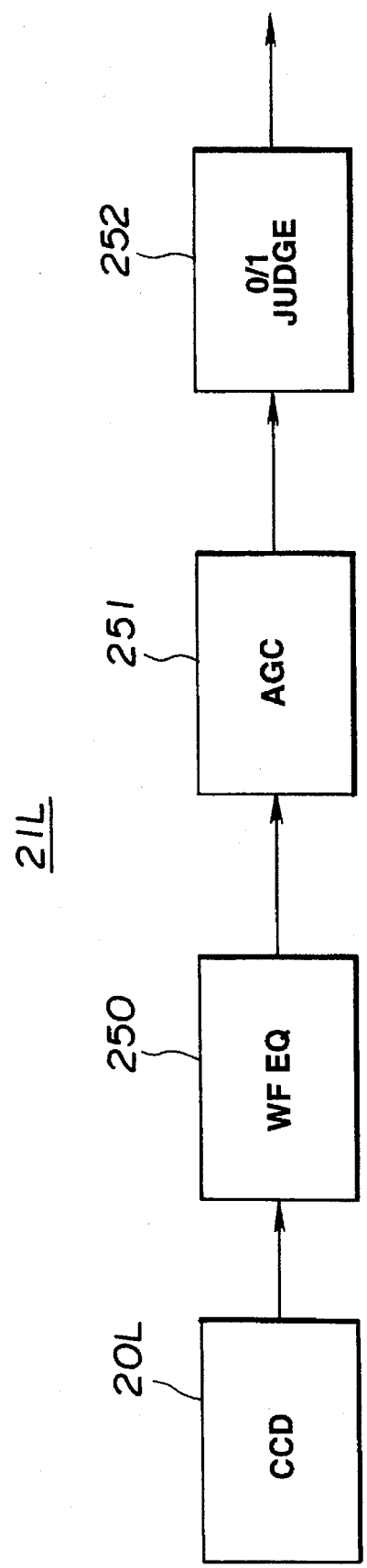
FIG. 30 shows a block diagram consisting of a demodulator shown in FIG. 19.

FIG. 30 illustrates the construction of the demodulator 21L used in the motion picture film reproducing apparatus of FIG. 19. Since the construction of the demodulator 21R is the same as that of the demodulator 21L, the explanation will be given only for the demodulator 21L. The demodulator 21L includes a CCD line sensor 20L, a waveform equalizer 250, which shapes the reproduced left route audio data, an automatic gain control circuit 251, which adjusts the signal level of the reproduced audio data signal, and a judgement circuit 252 which converts the reproduced audio data signal into binary data.

During reproduction of the movie film 1, the audio data reproduced by CCD line sensor 20L may be distorted. The waveform equalizer 250 reduces such distortion. The AGC circuit 251 adjusts the signal level of the reproduced audio data signal so that each particular bit has a constant amplitude. The adjusted signal is provided to the judgment circuit 252 which compares the reproduced audio data signal 251 with a threshold value. The judgment circuit 252 uses this comparison to convert the reproduced audio data signal into binary data. This binary data is then supplied to the previously mentioned error correction circuit 22L.

Figures 31A, 31B, 31C:
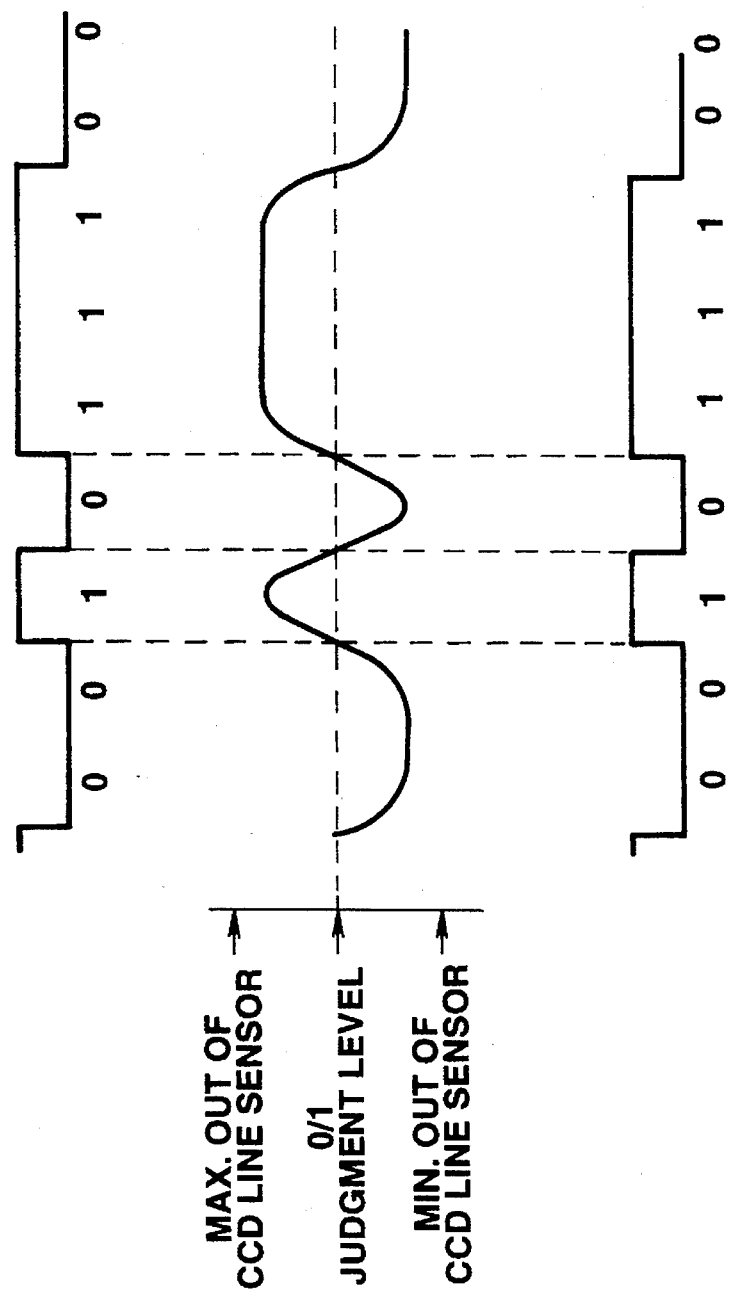
FIGS. 31(a) to 31(c) show waveforms during playback operation.

For example, FIG. 31(a) illustrates a bit stream "001011100 - - - ", which is recorded on the motion picture film 1 as left route audio data. FIG. 31(b) illustrates the reproduced waveform of the audio data of FIG. 31(a) as supplied by CCD line sensor 20L to the input of judgment circuit 252 after having passed through waveform equalizer 250 and AGC circuit 251. As seen in FIG. 31(b), this reproduced waveform has rounded edges and its high frequency component has been attenuated.

The threshold value of judgment circuit 252 is at the midpoint between the maximum value and the minimum value of the output from the CCD line sensor 20L. If the amplitude of the waveform supplied to the input of judgment circuit 252 is less than this threshold value, the output of judgment circuit 252 is "0". If this amplitude is greater than the threshold value, the output of judgment circuit 252 is "1". For example, the bit stream of "001011100 - - - " is generated as the bit stream shown in FIG. 31(c).

The recorded level of the audio data pattern on the film varies depending on the depth of film development, the unsymmetrical recording characteristics of the audio data pattern, and the like.

Figures 32A, 32B, 32C:
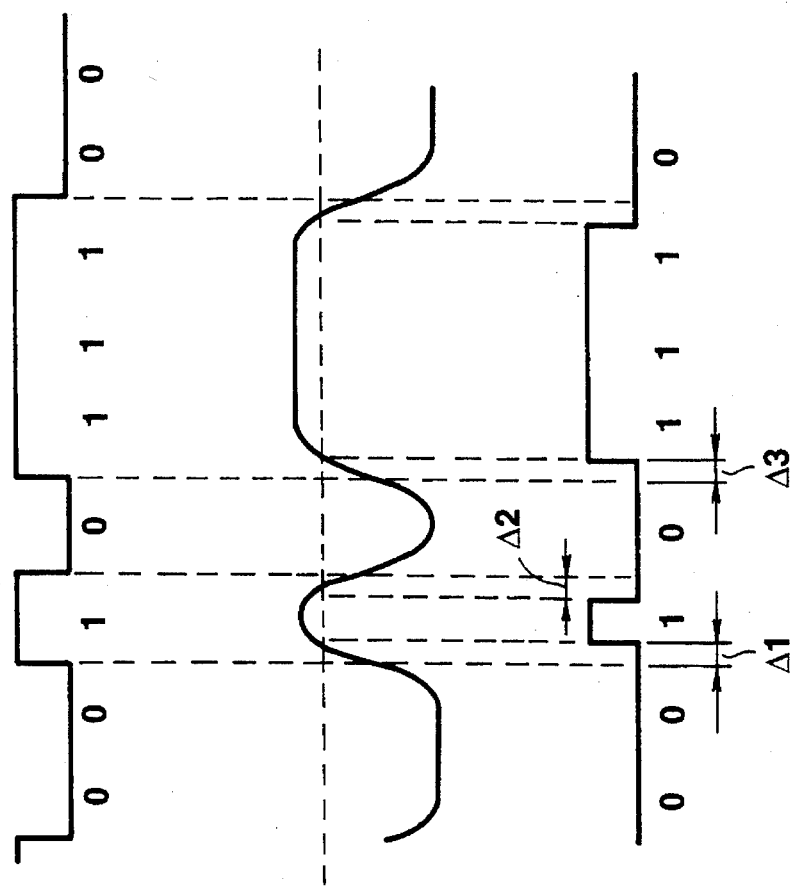
FIGS. 32(a) to 32(c) show waveforms during playback operation with an undesired error.

Let it be assumed that the waveform reproduced from motion picture film 1 appears at judgment circuit 252 with a depth of development in the form illustrated in FIG. 32(b). A comparison of this waveform with the waveform of FIG. 31(b) indicates that the waveform of FIG. 32(b) is shifted downward in amplitude, but has retained the same shape of the waveform of FIG. 31(b). As in FIG. 31, judgment circuit 252 converts its input waveform into binary data by using as a threshold value the midpoint between the minimum and maximum values of the output of CCD line sensor 20L. When the judgment circuit 252 converts the waveform of FIG. 32(b) into the binary data stream of FIG. 32(c), a comparison of this data stream with the one in FIG. 32(a) reveals that the phase margins of the FIG. 32(c) data stream have decreased. This decrease is caused by the offset between the level where the recording data is "1" and the level where the judgment circuit 252 makes a determination of "1". The errors Δ1, Δ2 and Δ3 are generated between a period where the actually recorded data is "1" as shown in FIG. 32(a) and the period when the reproduced data is "1" as shown in FIG. 32(c). Therefore, an increased error rate of the reproduced audio data may occur.

FIG. 33(b) illustrates a waveform, as it appears at the input of judgment circuit 252, that has been reproduced from an audio data pattern with unsymmetrical recording characteristics. Since the audio data has unsymmetrical recording characteristics, the reproduced waveform of FIG. 33(b) has unsymmetrical reproducing characteristics. In other words, the unsymmetrical reproducing characteristics exist between a period where the level of audio data is more than the threshold value when the data is "1" and a period where the level of audio data is less than the threshold value when the data is "0". As in FIGS. 31 and 32, judgment circuit 252 converts its input waveform into binary data by using as a threshold value the midpoint between the minimum and maximum values of the output of the CCD line sensor 20L. When the waveform of FIG. 33(b) is converted into the binary data stream of FIG. 33(c), a comparison of this data stream with the one in FIG. 33(a) reveals that the phase margins of the FIG. 33(c) data stream have decreased. In other words, the errors Δ4, Δ5 and Δ6 are generated between a period where the actually recorded data is "1" as shown in FIG. 33(a) and the period when the reproduced data is "1" as shown in FIG. 33(c). Therefore, an increased error rate of the reproduced audio data may occur.

Figure 34:
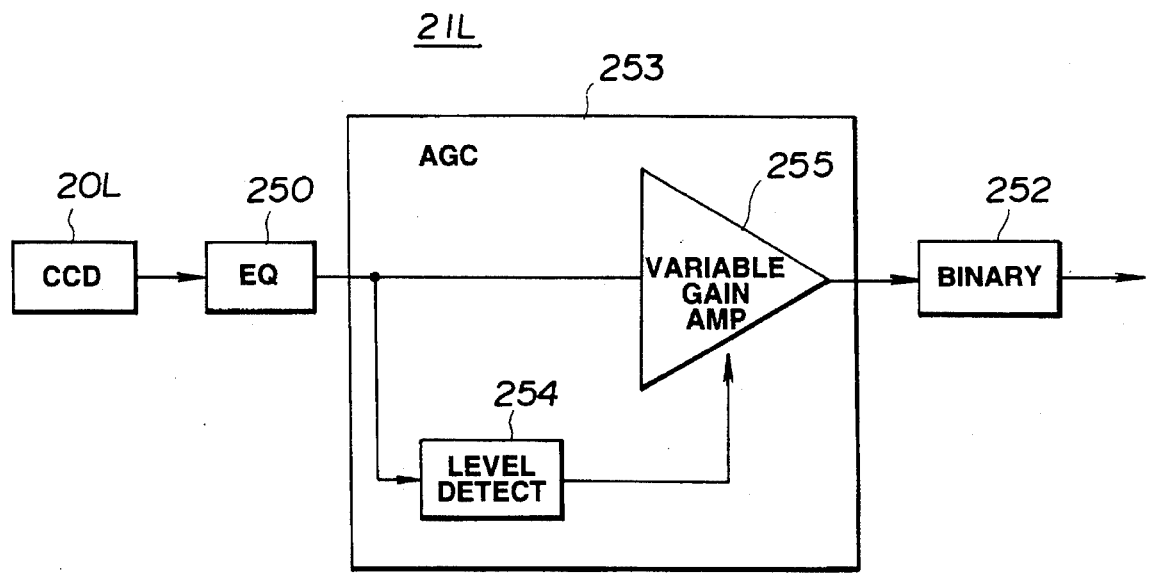
FIG. 34 shows an embodiment of the demodulator shown in FIG. 19.

FIG. 34 illustrates an alterative construction of demodulator 21L; this demodulator includes AGC circuit 253, instead of AGC circuit 251. AGC circuit 253 addresses the increased error rate resulting from the decreased phase margins discussed above. AGC circuit 253 includes a level detector 254, which detects the reproduced level of the previously mentioned tracking patterns 53a and 53b, and a gain adjusting portion 255, which adjusts the level of the audio data by using the output of the level detector 254.

The level detector 254 of AGC circuit 253 detects the difference between the reproduced level of tracking patterns 53a and 53b and the reproduced data level when the recorded data is "0" or "1". Then, the detector 254 controls the gain of the gain adjusting portion 255, thereby making the difference constant. In other words, the level detector 254 averages the reproduced levels of tracking patterns 53a and 53b. Then, level detector 254 controls the gain of the gain adjusting portion 255 in order to make constant the difference between the average of the reproduced levels of tracking patterns 53a and 53b and the reproduced data level when the recorded data is "0" or "1".

When the films recorded with different data levels are reproduced, the reproduced signal level varies. The reproduced levels of tracking patterns 53a and 53b, therefore, similarly varies. Since, in the demodulator 21L, the gain of the gain adjusting portion 255 is controlled so as to make constant the difference between the average of the reproduced data levels of tracking patterns 53a and 53b and the reproduced level when the recorded data is "0" or "1" the signal level of the reproduced signal is compensated depending on the actual recording level. When judgment circuit 252 converts the reproduced signal to binary value data, the conversion is based on the reproduced signal with the compensated signal level. Therefore, judgment can be achieved depending on the actual recording level, which reduces the error rate.

Figure 35A:
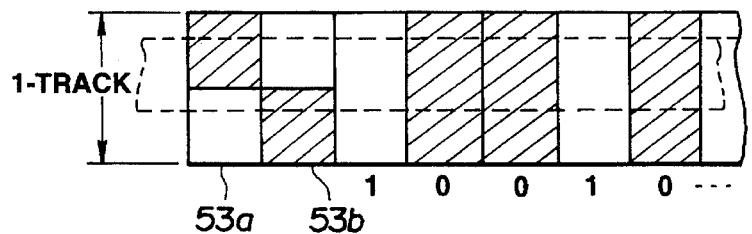
FIGS. 35(a) and 35(b) show waveforms when the tracking is offset in a direction.

When the CCD line sensor 20L deviates from the center of a track, as shown by the dotted lines in FIG. 35(a), it can reproduce the data patterns in the track so long as the CCD line sensor 20L is located within the track. The average of the reproduced levels of tracking patterns 53a and 53b can be obtained as a constant when the CCD line sensor 20L is located within the track. In other words, the gain adjustment can be performed based on the average of the reproduced levels of tracking patterns 53a and 53b.

The demodulator 21L reproduces audio data by adjusting the gain of the gain adjusting portion 255, which makes constant the difference between the average of the reproduced levels of tracking patterns 53a and 53b and the reproduced data level when the recorded data is "0" or "1".

Figure 35B:
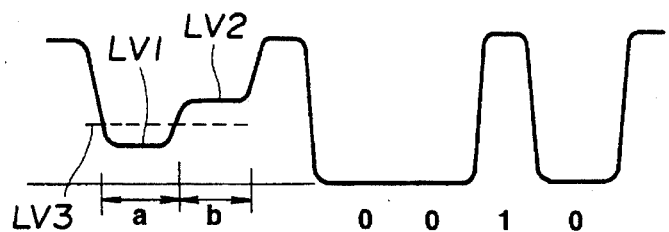

When CCD line sensor 20L has deviated upwardly from the center of the track, as shown by the dotted lines in FIG. 35(a), the reproduced signal of the audio data has a waveform as shown by FIG. 35(b), which is provided from the CCD line sensor 20L, waveform equalizer 250, level detector 254 and gain adjusting portion 255. The level LV1 of the area "a" corresponding to tracking pattern 53a is lower than the level LV2 of the area "b" corresponding to tracking pattern 53b. The level detector 254 obtains the averaged level LV3 between the level LV1 and level LV2 and controls the gain of the gain adjusting portion 255 so as to make constant the level difference between this level LV3 and the levels corresponding to data "0" or "1".

Figure 36A:
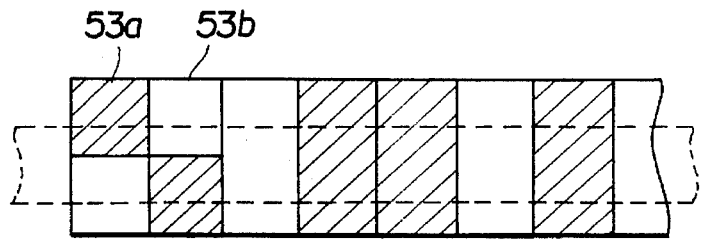
FIGS. 36(a) and 36(b) show waveforms when the tracking is offset in another direction.
Figure 36B:
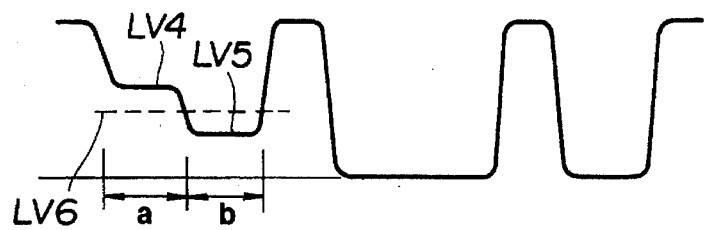

When CCD line sensor 20L has deviated downwardly from the center of the track, as shown by the dotted lines in FIG. 36(a), the reproduced signal of the audio data has a waveform as shown by FIG. 36(b), provided from the CCD line sensor 20L, waveform equalizer 250, level detector 254 and gain adjusting portion 255. The level LV4 of the area "a" corresponding to tracking pattern 53a is higher than the level LV5 of the area "b" corresponding to tracking pattern 53b. The level detector 254 obtains the averaged level LV6 between the level LV3 and level LV4 and controls the gain of the gain adjusting portion 255 so as to make constant the level difference between this level LV6 and the levels corresponding to data "0" or "1".

Figure 37A:
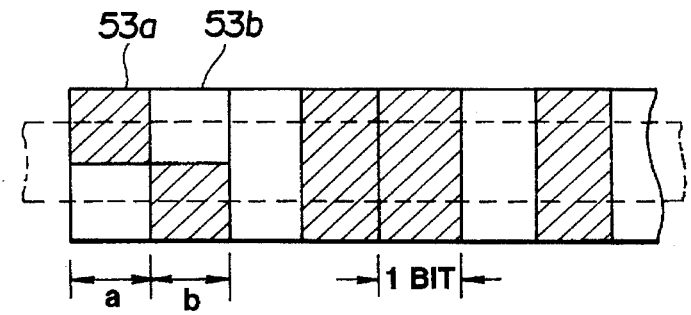
FIGS. 37(a) and 37(b) show waveforms under a condition of just-tracking.
Figure 37B:
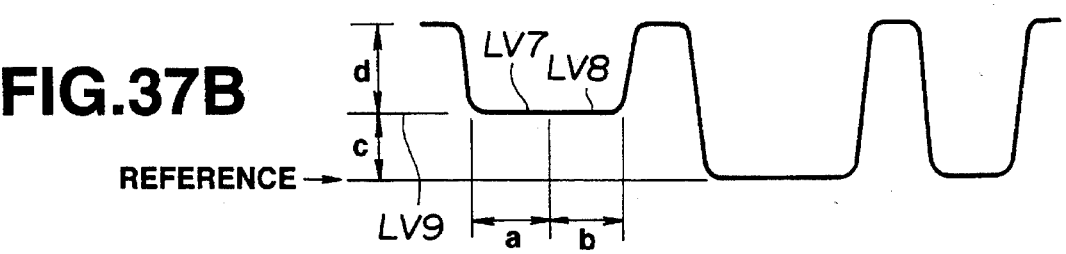

When CCD line sensor 20L is at the center of the track (under a just tracking condition), as shown by the dotted lines in FIG. 37(a), the reproduced signal of the audio data has a waveform as shown by FIG. 37(b), which is provided from the CCD line sensor 20L, waveform equalizer 250, level detector 254 and gain adjusting portion 255. The level LV7 of the area "a" corresponding to tracking pattern 53a is equal to the level LV8 of the area "b" corresponding to tracking pattern 53b. The level detector 254 obtains the averaged level LV9 between the level LV7 and level LV8 and controls the gain of the gain adjustment portion 255 so as to make constant the level difference between this level LV9 and the levels corresponding to data "0" or "1".

In other words, when CCD line sensor 20L is at the center of the track, the levels LV7 and LV8 of the areas "a" and "b" of the tracking patterns 53a and 53b are equal to each other. However, the levels LV7 and LV8 have a value depending on the depth of film development and unsymmetrical characteristics of the audio data pattern. In other words, when the recording level of the audio data pattern is high (or low), the averaged level of areas "a" and "b" corresponding to tracking pattern 53a and 53b becomes high (or low).

Since the gain adjustment portion 255 is controlled so as to make constant a difference "c" between the level LV9 and the level corresponding to data "0" and also make constant a difference "d" between the level LV9 and the level corresponding to data "1" in this demodulator 21L, the reproduced level is compensated in accordance with the actual variation of the recording level of the audio date. The errors Δ1 to Δ6 can be decreased when the reproduced level is compared with the threshold level of the judgment circuit 252 before being converted into binary data. The error rate thus can be reduced.

As a result, since the reproduced level can be compensated in accordance with the actual variation of recording level in this demodulator 21L, the error rate can be reduced and therefore, the audio data can be reproduced accurately from the digital sound recording track.

Figure 38:
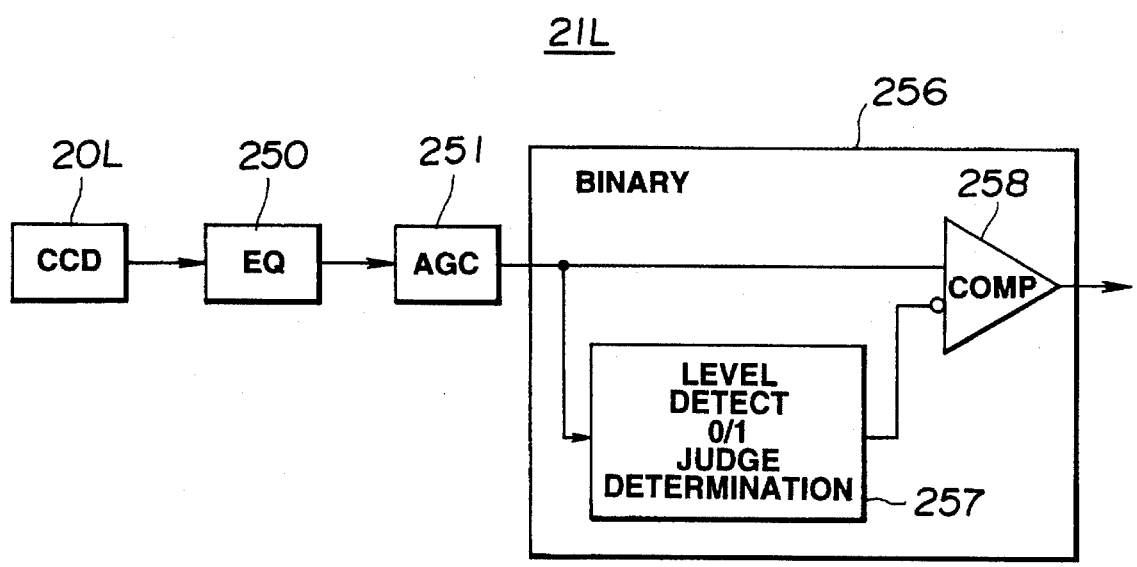
FIG. 38 shows another embodiment of the demodulator shown in FIG. 19.

FIG. 38 shows an alternative construction of demodulator 21L, which includes judgment circuit 256, instead of judgment circuit 252. Judgment circuit 256 comprises a level detector portion 257 and a comparator 258. The level detector portion 257 detects the reproduced levels of tracking patterns 53a and 53b. The comparator 258 converts the reproduced waveform into binary data depending on the detected output of the detector portion 257.

The detector portion 257 not only detects the reproduced levels of tracking patterns 53a and 53b, but it also determines a threshold value based on the detected reproduced levels. The detector portion 257 then supplies the comparator 258 with this threshold value. The comparator 258 compares the reproduced waveform supplied by AGC circuit 251 with the threshold value, thereby converting the reproduced waveform into binary data.

As previously described, the reproduced level of audio data varies depending on the development depth of the film and the unsymmetrical recording characteristics of the audio data pattern. If the average of the maximum value and the minimum value of the output from the optical pick-up of the CCD line sensor 20L is simply utilized as the threshold value, the error rate is increased in the binary data converted from the audio data.

The reproduced levels of tracking patterns 53a and 53b also vary depending on the development depth of film and the unsymmetrical recording characteristics of the audio data pattern. Therefore, the threshold value is determined by seeking the average of the reproduced levels of tracking patterns 53a and 53b by using the level detector portion 257 of demodulator 21L. In other words, when the reproduced levels of tracking patterns 53a and 53b are low, the threshold value as the averaged reproduced level also becomes low. When the reproduced levels of tracking patterns 53a and 53b are high, the threshold value as the averaged reproduced level also becomes high. Thus, the appropriate threshold value is determined in accordance with the reproduced level of the audio data pattern in this demodulator 21L.

The comparator 258 converts the reproduced waveform supplied by AGC circuit 251 into binary data based on the threshold value determined by the level detector portion 257. Thus, the conversion to binary data can be accurately performed based on the appropriate threshold value in accordance with the reproduced level of the audio data pattern. The previously mentioned errors Δ1 to Δ6 that occur when converting into binary data can be decreased, and therefore, the error rate can also be decreased.

As previously described, the signal levels of reproduced signals vary when a motion picture film has recorded different recording levels. The reproduced levels of tracking patterns 53a and 53b are similarly varied. Since the binary conversion at the demodulator 21L is performed with the threshold value as the average of the reproduced levels of tracking patterns 53a and 53b, the signal level of the reproduced signal can be compensated corresponding to the recording level of the reproduced signal. In other words, demodulator 21L performs this determination depending on the actual recording level of the audio data pattern and, therefore, the error rate can be decreased.

When the CCD line sensor 20L deviates from the center of a track as shown by the dotted lines in FIG. 35(a), it can reproduce data patterns in the track so long as the CCD line sensor 20L is located within the track. The average of the reproduced level of tracking patterns 53a and 53b can be obtained as a constant when the CCD line sensor 20L is located within the track. In other words, the reproduced signal can be converted into binary data with the threshold value as the average of the reproduced levels.

When CCD line sensor 20L has deviated upwardly from the center of a track as shown by the dotted lines in FIG. 35(a), the reproduced signal of the audio data has a waveform as shown by FIG. 35(b), which is provided to the level detect portion 257 and the comparator 258. The level LV1 of an area "a" corresponding to a tracking pattern 53a is lower than the level LV2 of an area "b" corresponding to a tracking pattern 53b. The level detect portion 257 obtains the averaged level LV3 between the level LV1 and level LV2, and sends the level LV3 to the comparator 258 as its threshold value. The comparator 258 then converts the reproduced signal of the audio data into binary data based on the threshold value provided by the level detect portion 257.

When CCD line sensor 20L has deviated downwardly from the center of a track as shown by the dotted lines in FIG. 36(a), the reproduced signal of audio data has a waveform as shown by FIG. 36(b), which is provided to the level detect portion 257 and the comparator 258. The level LV4 of an area "a" corresponding to a tracking pattern 53a is higher than the level LV5 of an area "b" corresponding to a tracking pattern 53b. The level detect portion 257 obtains the averaged level LV6 between the level LV4 and level LV5, and sends the level LV6 to the comparator 258 as its threshold value. The comparator 258 then converts the reproduced signal of the audio data into binary data based on the threshold value provided by the level detect portion 257.

Considering the read out operation by the CCD line sensor 20L when it is at the center of a track (under a just tracking condition) as shown by the dotted lines in FIG. 37(a), the reproduced signal of the audio data has the waveform as shown by FIG. 37(b), which is provided to the level detect portion 257 and the comparator 258. The level LV7 of an area "a" corresponding to a tracking pattern 53a is equal to the level LV8 of an area "b" corresponding to a tracking pattern 53b. The level detect portion 257 obtains the averaged level LV9 between the level LV7 and level LV8 and sends the level LV9 to the comparator 258 as its threshold value. The comparator 258 converts the reproduced signal of the audio data into binary data based on the threshold value provided from the level detect portion 257.

Thus, the conversion of the reproduced signal into binary data is performed by using the threshold value as the average level of tracking pattern 53a and 53b in this demodulator 21L. The determination of the appropriate threshold value can be performed with the actual recording level. Since the conversion of the audio data into binary data is performed based on this threshold value, the error rate can be decreased. This decreased error rate increases the accuracy of the binary data reproduced from the audio data recorded in the digital sound track.

While specific embodiments of the invention have been shown and disclosed, it is to be understood that numerous changes and modifications may be made by those skilled in the art without departing from the spirit and scope and intent of the invention.

For example, the above embodiments describe a threshold value determination when audio data is reproduced from a film on which the data pattern is recorded in accordance with binary values. The threshold value can be similarly determined when reproducing audio data from a film in which the data pattern is recorded in accordance with multi-valued data.

What we claim is:

1. A motion picture film on which a digital sound track for audio data is formed along a film running direction comprising:

data tracks disposed in the digital sound track along a direction normal to the film running direction and extending in the film running direction;

a data pattern comprising a block of audio data recorded in each of said data tracks;

a plurality of tracking patterns representing each of said data tracks, each said tracking pattern being recorded at one side of the data track extending in the film running direction; and an azimuth check pattern repeatedly recorded within said data pattern, said azimuth check pattern representing an azimuth angle of each of said data tracks for each block of audio data.

2. A motion picture film according to claim 1, wherein said plurality of tracking patterns are recorded near an edge of said motion picture film.

3. A motion picture film according to claim 1, in which said plurality of tracking patterns are offset along the film running direction by one-half track width of one of said data tracks from a center of said data track.

4. An apparatus for reproducing sound data from a movie film, said movie film including a digital sound track and having data tracks disposed within said digital sound track along a direction normal to the film running direction and extending in the film running direction, a data pattern comprising a block of audio data recorded in each of said data tracks, a plurality of tracking patterns representing each of said data tracks, each said tracking pattern being recorded at one side of the data track extending in the film running direction, and an azimuth check pattern repeatedly recorded within said data pattern, such azimuth check pattern representing an azimuth angle of each of said data tracks for each block of audio data, said apparatus comprising:

means for reading the digital sound track;

means for detecting a tracking error based on said plurality of tracking patterns supplied from said reading means;

means for repeatedly detecting said azimuth angle for said block of audio data based on said azimuth check pattern supplied from said reading means; and means for compensating for said tracking error in response to the detected tracking error and said means for repeatedly detecting said azimuth angle.

5. The apparatus according to claim 4, wherein said means for reading said digital sound track is operable to scan said plurality of tracking patterns, and said tracking patterns extend along an edge of said movie film.

6. The apparatus according to claim 4, wherein said means for reading said digital sound track is operable to scan said plurality of tracking patterns, and said plurality of tracking patterns are offset along the film running direction by one-half track width of one of said data tracks from a center of each of said data tracks.

7. A motion picture film on which a digital sound track for audio data is formed along a film running direction comprising:

data tracks having a width disposed in the digital sound track along a direction normal to the film running direction and said data tracks extending in the film running direction;

a data pattern comprising a block of audio data recorded in each of said data tracks; and a plurality of tracking patterns representing each of said data tracks, each said tracking pattern being recorded at one side of the data track along the film running direction, and said plurality of tracking patterns being offset along the film running direction by one-half the width of one of said data tracks from a center of each of said data tracks.

8. An apparatus for reproducing sound data from a movie film, said movie film including a digital sound track and having data tracks exhibiting a width disposed within said digital sound track along a direction normal to the film running direction and extending in the film running direction, a data pattern comprising a block of audio data recorded in each of said data tracks, a plurality of tracking patterns representing each of said data tracks, each of said plurality of tracking patterns being recorded at one side of the data track extending in the film running direction, wherein said plurality of tracking patterns are offset along the film running direction by one half the width of one of said data tracks from a center of each of said data tracks, said apparatus comprising:

means for reading the digital sound track;

means for detecting a tracking error based on said plurality of tracking patterns supplied from said reading means; and means for compensating for said tracking error in response to the detected tracking error.

9. The apparatus according to claim 8, wherein said means for reading the digital sound track further comprises:

detecting means for detecting a reproduced level of said plurality of tracking patterns; and means for adjusting the reproduced level of said data pattern based on the reproduced level of said plurality of tracking patterns detected by said detecting means.

10. The apparatus according to claim 8, wherein said means for reading the digital sound track further comprises:

detecting means for detecting a reproduced level of said plurality of tracking patterns;

means for determining a threshold value based on the reproduced level of said plurality of tracking patterns detected by said detecting means; and means for converting a reproduced data pattern into a binary signal as a function of the determined threshold value.

* * * * *